（12）United States Patent
Rotondo et al.

(10) Patent No.: US 8,985,546 B2
(45) Date of Patent: Mar. 24, 2015

(54) EXTERIOR WALL FORMS WITH CORE WALLS FOR THE RAPID MANUFACTURING OF CONCRETE MODULAR HOUSING UNITS

(75) Inventors: Mario Paul Rotondo, Bradenton, FL (US); Steven John Weirich, Schwenksville, PA (US)

(73) Assignee: Rotondo Weirich, Inc., Lederach, PA (US)

( * ) Notice: Subject to any disclaimer, the term of this patent is extended or adjusted under 35 U.S.C. 154(b) by 1126 days.

(21) Appl. No.: 12/807,961

(22) Filed: Sep. 17, 2010

(65) Prior Publication Data

US 2011/0067351 A1    Mar. 24, 2011

Related U.S. Application Data

(60) Provisional application No. 61/276,976, filed on Sep. 18, 2009, provisional application No. 61/281,880, filed on Nov. 23, 2009.

(51) Int. Cl.
| | |
|---|---|
| *E04B 1/348* | (2006.01) |
| *B29C 33/30* | (2006.01) |
| *B28B 7/00* | (2006.01) |
| *B28B 7/22* | (2006.01) |
| *B28B 7/30* | (2006.01) |

(52) U.S. Cl.
CPC ........... *E04B 1/34823* (2013.01); *B29C 33/304* (2013.01); *B28B 7/0088* (2013.01); *B28B 7/22* (2013.01); *B28B 7/30* (2013.01)
USPC ............................ 249/152; 249/177; 249/186

(58) Field of Classification Search
CPC ........ E04G 11/02; E04G 11/08; E04G 11/082
USPC ......... 249/13, 18, 26, 27, 142, 144, 152, 178, 249/180, 184, 186, 176, 177; 425/468
See application file for complete search history.

(56) References Cited

U.S. PATENT DOCUMENTS

| | | |
|---|---|---|
| 1,355,122 A | 10/1920 | Bintliff |
| 3,853,452 A | 12/1974 | Delmonte |
| 3,915,422 A | 10/1975 | Nobbe |

(Continued)

OTHER PUBLICATIONS

Written Opinion, International Application No. PCT/US2010/002532, The International Searching Authority, dated Nov. 22, 2010, 10 Pages (unnumbered).

*Primary Examiner* — Michael Safavi
(74) *Attorney, Agent, or Firm* — Hoffman Warnick LLC

(57) ABSTRACT

A system for accelerated manufacturing of concrete modular housing units including a first deck platform including a plurality of exterior movable wall forms. A second deck platform including a plurality of exterior movable wall forms. A first concrete slab is placed on the first deck platform. At least one core including a plurality of core walls placed on the first concrete slab. The exterior movable wall forms of the first deck platform are positioned proximate the core walls to define a wall space there between configured to receive wet concrete and create a first concrete modular housing unit. A second concrete slab is placed on the second deck platform. Wet concrete in the wall space is allowed to set a until it is partially cured and then the at least one core is removed from the first concrete slab and placed on the second concrete slab such that the at least one core can be reused one or more times during a predetermined amount of time to create a least a second concrete modular housing unit while the first concrete modular housing unit is still curing.

20 Claims, 35 Drawing Sheets

(56) References Cited

U.S. PATENT DOCUMENTS

| | | |
|---|---|---|
| 3,982,874 A | 9/1976 | Nobbe |
| 4,158,942 A | 6/1979 | Hart |
| 4,300,746 A | 11/1981 | Schoen |
| 4,426,060 A | 1/1984 | Csont |
| 4,495,131 A | 1/1985 | Del Valle |
| 4,650,150 A | 3/1987 | Pacheco-Pifano |
| 4,667,923 A | 5/1987 | Lee |
| 4,790,508 A | 12/1988 | Henderson et al. |
| 5,448,866 A | 9/1995 | Saito et al. |
| 5,465,945 A | 11/1995 | Matsushita et al. |
| 5,524,861 A | 6/1996 | Solomon |
| 5,845,457 A | 12/1998 | Wybauw |
| 6,827,326 B2 | 12/2004 | Giri |
| 2004/0040239 A1 | 3/2004 | Baillargeon |
| 2007/0234664 A1 | 10/2007 | Tucker |

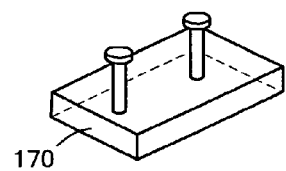
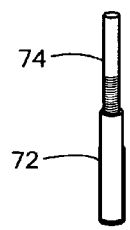
FIG. 13A  FIG. 13B
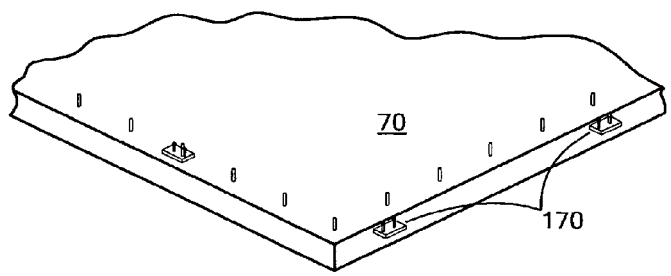
FIG. 13C
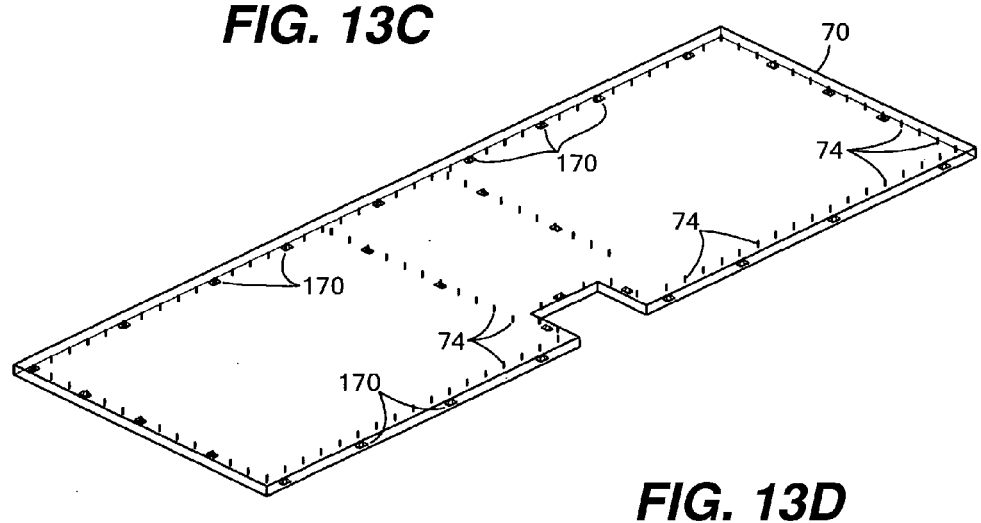
FIG. 13D

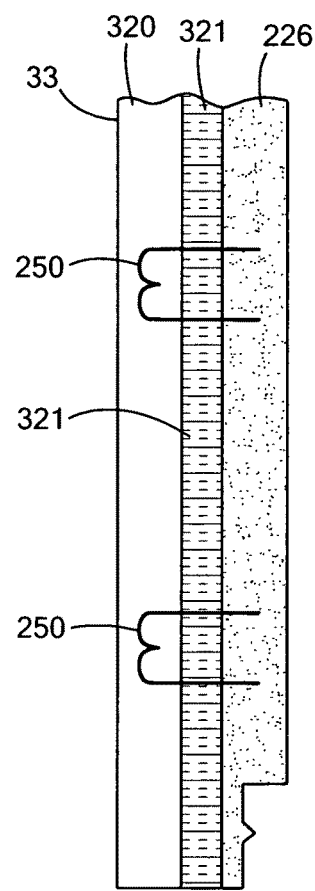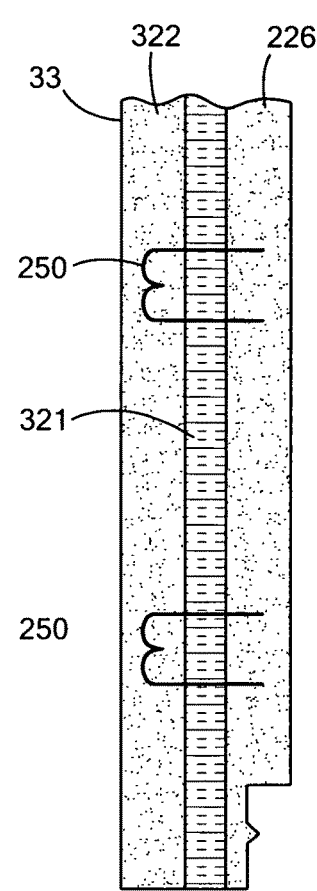
*FIG. 33*  *FIG. 34*

EXTERIOR WALL FORMS WITH CORE WALLS FOR THE RAPID MANUFACTURING OF CONCRETE MODULAR HOUSING UNITS

RELATED APPLICATIONS

This application claims benefit of and priority to U.S. Provisional Application Ser. No. 61/276,976, filed Sep. 18, 2009, and U.S. Provisional Application Ser. No. 61/281,880, filed Nov. 23, 2009 under 35 U.S.C. §§119, 120, 363, 365, and 37 C.F.R. §1.55 and §1.78 incorporated herein by this reference.

FIELD OF THE INVENTION

This invention relates to a system and method for the rapid manufacturing of concrete modular housing units thereof.

BACKGROUND OF THE INVENTION

One conventional system and method for manufacturing concrete modular housing units relies on form assemblies that are detachably connected to a concrete floor slab. Concrete is poured or pumped into the wall space between the wall forms and onto roof forms where the concrete is spread and leveled. After the concrete has taken a substantial set and begun to harden, the forms are removed and hauled to the next concrete floor slab. Typically, the two form assemblies remain connected together at the location where the housing units will be erected. See, e.g., U.S. Pat. No. 4,246,060, incorporated by reference herein.

Another conventional system and method for manufacturing concrete modular housing units uses a molding apparatus for molding in place walls of a structure poured on a concrete floor. The apparatus has a central support member to which are moveably attached wall molds and corner molds cooperate with exterior molds to form a cast structure. Concrete is pumped into the cast structure, and, after the concrete hardens, the exterior molds are removed and then transported to another site. See, e.g., U.S. Pat. No. 4,650,150, incorporated by reference herein.

Yet another system and method for manufacturing concrete modular housing units comprises a modular floor deck which is affixed to a plant floor. Tracks are leveled and secured to the plant floor. Interior cores are then placed on the form deck and secured to the deck. Side wall forms are then placed on the tracks and leveled and permanently secured to the tracks. A removable chase core is then positioned in the space between the inside cores to form a utility chase. Once all the form components are properly aligned, the casting process begins. Typically, this may include spraying oil on the walls to ensure the concrete will not stick to the forms. Then a wire cage may be placed between the forms followed by the placement of a wire mesh cage. The necessary conduits and electrical boxes are then secured. Next, the outer wall forms are closed and secured together by bolting them to the base as well as other walls. Concrete is then poured in the form and the top may be finished using bull floats and trowels to achieve a smooth and level finish roof. The module then cures for several hours until the concrete has achieved the necessary strength. Once the strength is achieved the chase core is removed and the walls are then unbolted in the tracks. The module is then lifted using a mobile crane. The entire process typically takes about 24 hours.

However, using the conventional systems and methods described above, the forms are not useable until the concrete has hardened and the completed housing unit is removed therefrom. This prevents the same forms from being used more than once a day. Such a design significantly slows the manufacturing process of concrete modular housing units.

The exterior walls of concrete modular housing units typically have a smooth flat finish. Often, the exterior surface is removed (e.g., by sand blaster or with a high pressure water jet) to expose the aggregate (rock) in the concrete and create exposed aggregate walls. However, vertically pouring concrete into the wall forms causes the heavier aggregate to settle at the bottom of the wall. A vibrator is often used in the manufacturing process which further induces faster settling of the aggregate. Additionally, the excessive weight and gravitational forces of the concrete to be poured located above a ten or twelve foot form results in loss of control of the placement of the aggregate in the finished wall. The result of the aforementioned problems is typically an exterior wall having a non-uniform distribution of the aggregate and thus an uneven finish.

SUMMARY OF THE INVENTION

This invention features a system for accelerated manufacturing of concrete modular housing units including a first deck platform including a plurality of exterior movable wall forms. A second deck platform includes a plurality of exterior movable wall forms. A first concrete slab is placed on the first deck platform. At least one core includes a plurality of core walls placed on the first concrete slab. The exterior movable wall forms of the first deck platform are positioned proximate the core walls to define a wall space there between. The wall space is configured to receive wet concrete and create a first concrete modular housing unit. A second concrete slab is placed on the second deck platform. The wet concrete in the wall space is allowed to set until it is partially cured and then the at least one core is removed from the first concrete slab and placed on the second concrete slab such that the at least one core can be reused one or more times during a predetermined amount of time to create at least a second concrete modular housing unit while the first concrete modular housing unit is still curing.

In one embodiment, the predetermined amount of time may be about twenty-four hours. The at least one core may be removed from the first concrete slab after about at least 2 hours. The at least one core may be turned upside down prior to be placed on the second deck platform. The at least one core may include at least one movable corner slug. The at least one movable corner slug may be V-shaped. The at least one movable corner slug may be configured to be positioned in an expanded position and in an elevated position. The elevated position may be configured to allow the core walls to provide a necessary space between the wall forms and the partially cured concrete in the wall space to allow the core to be removed from the first deck platform or the second deck platform while the concrete is still curing. The at least one core may include a plurality of cores. One or more of the core walls of the core may include an alignment pin on a bottom surface thereof and/or an alignment pin on the top surface thereof. The first concrete slab and/or the second concrete slab each may include a plurality of precast slots. The alignment pin may mate with the precast slots such that the core may be positioned at a predetermined location on the first concrete slab or the second concrete slab. The first concrete slab and/or the second concrete slab may be previously poured. The first concrete slab and/or the second concrete slab may be poured into a floor form and then turned upside down prior to being placed on the first deck platform or the second deck platform or the second deck platform such that the top surface thereof has a smooth finish. The first concrete slab and/or the second concrete slab may include a plurality of female inserts each configured to secure a rod. The first concrete slab and/or the second concrete slab may include a plurality of previously casted bent rods therein protruding upwardly from the first concrete slab and/or the second concrete slab. The system may include a reinforcing cage configured to be placed about the at least one core and attached to the rod in each of the female inserts. The reinforcing cage may be configured to be placed about the at least one core and attached to the bent rods. The first concrete slab and/or the second concrete slab may include one or more embeds configured to stabilize and level the first concrete and/or the second concrete slab at a predetermined elevation. The first deck platform may include one or more gaskets configured to position the first concrete slab on the first deck platform. The second deck platform may include one or more gaskets configured to position the second concrete slab on the first deck platform. The system may include at least one horizontally placed wall form configured to receive wet concrete in a controlled flow which negates gravitational forces to create at least one pre-poured wall. The at least one pre-poured wall may include a predetermined architectural finish. The controlled flow of the wet concrete may create the pre-poured wall with a uniform distribution of aggregate. The horizontally placed wall form may be lined with a liner including the predetermined architectural finish on an exterior surface thereof. The wet concrete may be poured over the liner. The insulation may be placed over the wet concrete and the liner. The system may include a plurality of securing devices embedded in the wet concrete and extending through the insulation to provide a bonding surface which extends into the wall space. The pre-poured wall may be positioned vertically proximate a core wall. The wet concrete may cure about the securing devices in the wall space to create a mechanical bond between the pre-poured wall and concrete in the wall space. The at least one pre-poured wall may be removed from the wall form. A plurality of pre-poured walls may be formed using the horizontally placed wall form. The at least one pre-poured wall and/or each of the plurality of pre-poured walls may include securing devices. One or more of the plurality of exterior movable wall forms may be replaced with one or more of pre-poured walls to form the wall space.

This invention also features a system for accelerated manufacturing of concrete modular housing units including a first deck platform including a plurality of exterior movable wall forms. At least one core includes a plurality of core walls placed on the first deck platform. The exterior movable wall forms of the first deck platform are positioned proximate the core walls to define a wall space there between. The wall space is configured to receive wet concrete and create a first concrete modular housing unit to be placed directly on a floor on slab. The wet concrete in the wall space is allowed to set until it is partially cured and then the at least one core is removed from the first deck platform and placed on the second deck platform such that the at least one core can be reused one or more times during a predetermined amount of time to create a second concrete modular housing unit to be placed directly on a floor on slab while the first concrete modular housing unit is still curing.

This invention further features a method for accelerated manufacturing of concrete modular housing units, the method including providing a first deck platform including a plurality of exterior movable wall forms, a second deck platform is provided including a plurality of exterior movable wall forms. A first concrete slab is placed on the first deck platform. At least one core including a plurality of core walls is placed on the first concrete slab. The exterior wall forms of the first deck platform are positioned proximate the core walls to define a wall space there Wet concrete is poured in the wall space to create a first modular housing unit. A second concrete slab is placed on the second deck platform. The wet concrete of the first modular housing unit is allowed to partially cure and then the at least one core is removed from the first concrete slab and placed on the second concrete slab such that the at least one core can be reused one or more times during a predetermined amount of time to create at least a second concrete modular housing unit while the first concrete modular housing unit is still cured.

In one embodiment, the predetermined amount of time may be about 24 hours. The at least one core may be moved from the first concrete slab after about at least 2 hours. The at least one core may include a plurality of corner slugs and the method may include positioning the corner slugs in an expanded position and in an elevated position. The at least one corner slug may be positioned to the elevated position to allow the core walls to provide the necessary space between the wall forms and the partially cured concrete in the wall space to allow the core to be removed from the first deck platform or the second deck platform while the concrete is partially cured. The method may include the step of forming an alignment pin on a bottom surface of one or more of the core walls and/or an alignment pin on the top surface thereof of the one or more of the core walls. The method may include the step of providing a plurality of precast slots in the first concrete slab and/or the second concrete slab. The method may include the step of aligning the alignment pin with the precast slots such that the core is positioned at a predetermined position on the first concrete slab and/or the second concrete slab. The method may include the step of providing a floor form and pouring concrete therein to form the first concrete slab and/or the second concrete slab. The method may include the step of providing a plurality of precast bent rods in each of the first concrete slab and/or the second concrete slab extending upwardly from the first concrete slab and/or the second concrete slab. The method may include the step of concrete turning the floor form with the cured first concrete slab or the cured second concrete slab therein upside down prior to being placed on the first deck platform or the second deck platform such that the top surface thereof has a smooth finish. The method may include the step of providing a plurality of female inserts in each of the first concrete slab and/or the second concrete slab. The method may include the step of placing a reinforcing cage about the at least one core and attaching the cage to the threaded rod in each of the female inserts. The method may include the step of placing a reinforcing cage about the at least one core and attaching the cage to the bent rods. The method may include the step of providing one or more embeds in the first concrete slab and/or the second concrete slab configured to stabilize and level the floor slab at a predetermined position. The method may include the step of pouring wet concrete into a horizontally placed wall form in a controlled flow which negates gravitational forces to create at least one pre-poured wall. The method may include the step of providing a predetermined architectural finish on the pre-poured wall. The method may include the step of placing a liner including the predetermined architectural finish an exterior surface thereof in the wall form before the concrete is poured. The method may include the step of pouring wet concrete over the liner. The method may include the step of placing insulation over the wet concrete. The method may include the step of placing a plurality of securing devices into the wet concrete which extends through the insulation to provide a bonding surface which extends into the wall space. The method may include the step of positioning the at least one pre-poured wall vertically proximate a core wall. The wet concrete may cure about the securing devices in the wall space to create a mechanical bond between the pre-poured wall and the wet concrete in the wall space. The at least one pre-poured wall may be removed from the horizontally placed wall form. A plurality of pre-poured walls may be formed using the horizontally placed wall form. The method may include the step of replacing one or more of the plurality of exterior movable wall forms with one or more pre-poured walls and positioning the one or more pre-poured walls proximate one or more core walls to define the wall space.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 13A is a three-dimensional top view showing a bolt assembly, FIG. 13B shows a three-dimensional view of an insert and rod, and FIGS. 13C and 13D each show in further detail one example of the bolt assembly and embeds cast into a floor slab in accordance with this invention;

FIG. 33 is a schematic side view of one example of a horizontally poured wall placed proximate a core wall showing a plurality of securing devices protruding from the horizontally poured wall;

FIG. 34 is a schematic side view showing the securing devices forming a mechanical bond to poured concrete in wall space shown in FIG. 32;

DETAILED DESCRIPTION OF THE INVENTION

Figure 1:
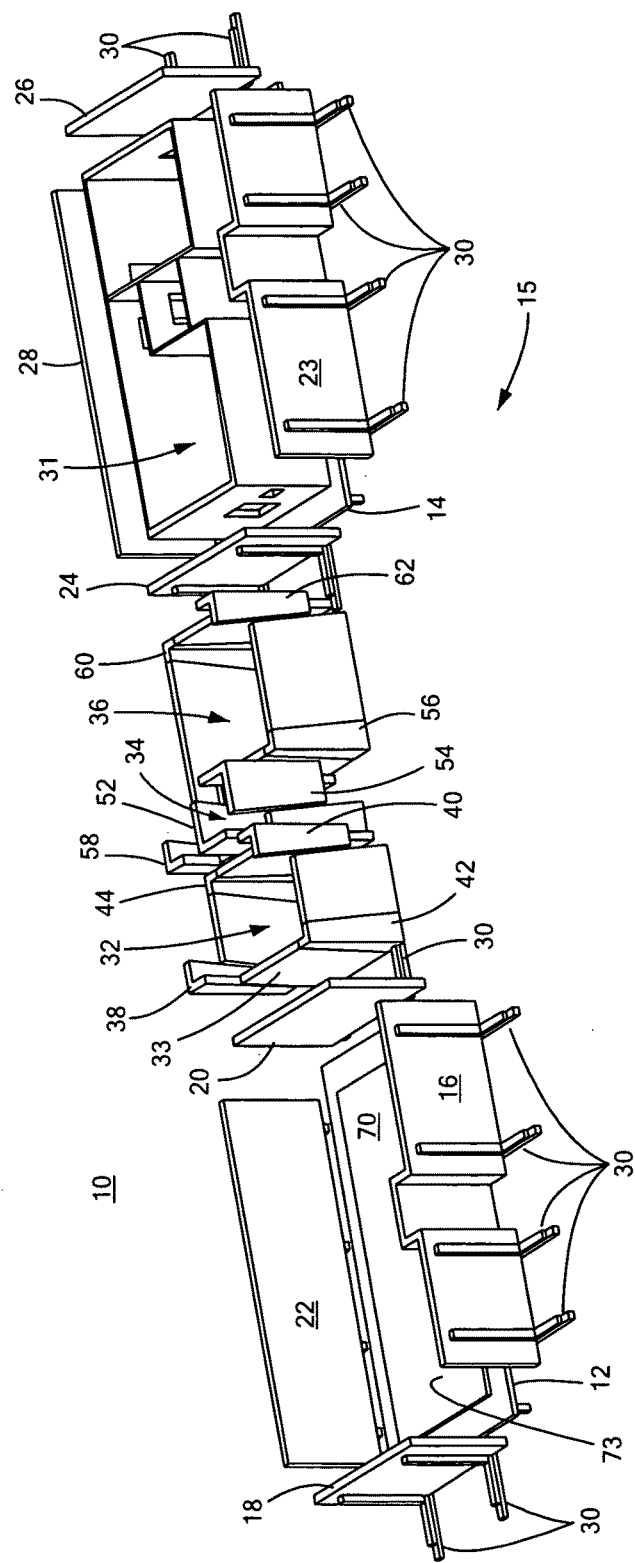
FIG. 1 is a three-dimensional front view of one embodiment of the system and method for rapid manufacturing of concrete modular housing units of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 one embodiment of system 10 for the rapid manufacturing of concrete modular housing units. System 10 includes at least two deck platforms on plant floor 15. In one example, system 10 may include left deck platform 12 and right deck platform 14 as shown. In other examples, the deck platforms 12 and 14 may be located in front and in back of each other. In other embodiments, deck platforms 12 and 14 may be at any location in which they are in proximity to each other. Deck platform 12 preferably includes movable front wall form 16, movable side wall forms 18 and 20, and movable back wall form 22. Similarly, right deck platform 14 preferably includes movable front wall form 23, movable side wall forms 24 and 26, and movable back form wall 28. The front, side, and back wall forms of deck platforms 12 and 14 preferably move on tracks 30, discussed in further detail below. In this example, a completed "right-side" concrete modular housing unit 31 manufactured in accordance with one embodiment of this invention is shown in place on right deck platform 14. Concrete modular housing unit 31 was preferably manufactured the previous day and is now curing under ambient conditions.

System 10 also includes at least one core, e.g., core 32, which is located in plant floor 15, typically between left and right deck platforms 12 and 14, e.g., at the beginning of a production day. Preferably, system 10 includes a plurality of cores, e.g., core 32, core 34, and/or core 36. Cores 32-36 are preferably designed for a particular specification of a concrete modular housing unit. The number, shape, and dimensions of the cores of system 10 may vary as needed to accommodate any particular design specification of a concrete modular housing unit. Core 32, and/or cores 34, and 36, preferably includes corner slugs, which are preferably V-shaped as shown. When the corner slugs are elevated, it causes the core to collapse within itself to provide the necessary space between the wall forms of the core and the partially cured concrete to allow the cores to be removed from the deck platform. In this example, core 32 preferably includes corner slugs 38, 40, 42, and 44 which are in between the wall forms of core 32. Similarly, core 34 preferably includes corner slugs 52 and 54 in between the wall forms of core 34. Core 36 ideally includes corner slugs 56, 58, 60 and 62 in between the wall forms of core 36. In operation, all of corner slugs of cores 32, 34, and 36 are in the elevated position at the beginning of each production day.

One example of the system and method for accelerated manufacturing of concrete modular housing units of one embodiment of this invention begins by placing previously poured concrete slab 70 (floor slab) on deck platform 12 using a mobile crane or similar type device. Preferably, concrete slab 70 has been pre-poured into a floor form and then turned upside down such that top surface 73 of floor slab 70 has a smooth finish (discussed in further detail below). Another alternative is to cast the floor slab into a floor form face up and place starter rebar in strategic locations and then pour concrete. This will eliminate the need to flip the floor and place female inserts in the floor slab at the time of casting. Once the floor slab is lifted in place on the deck platform, a cage is preferably then tied to the starter rebar protruding from the floor slab.

Figure 2:
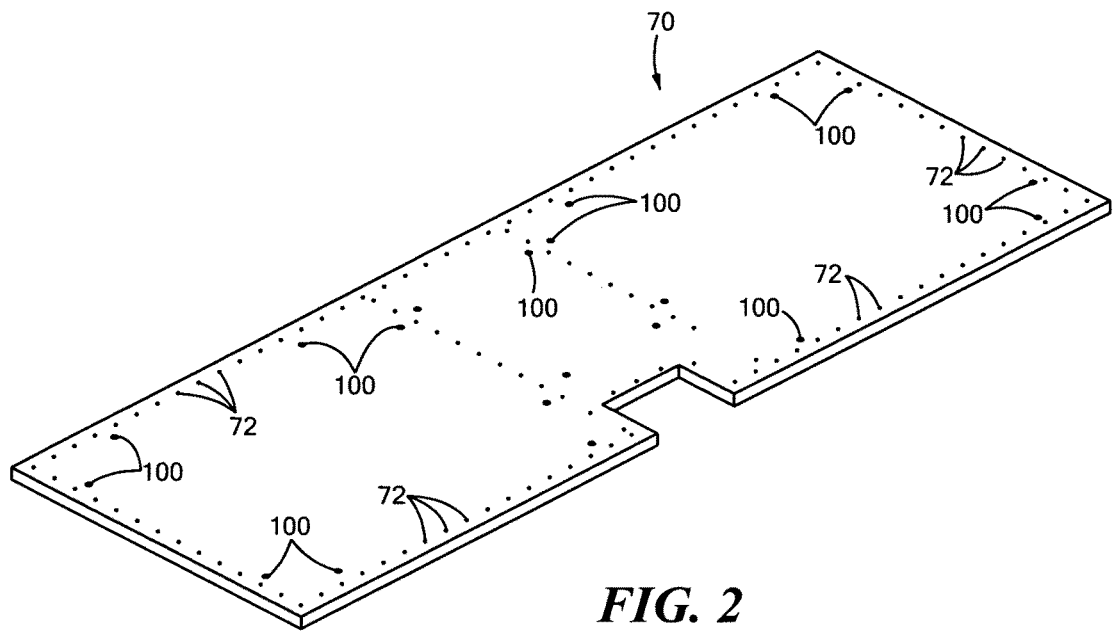
FIG. 2 is a three-dimensional top view showing one example of a poured concrete floor slab poured in accordance with one embodiment of this invention having inserts for receiving threaded rods and openings for receiving of alignment pins on the bottom of the wall forms of the cores shown in FIG. 1.
Figure 3:
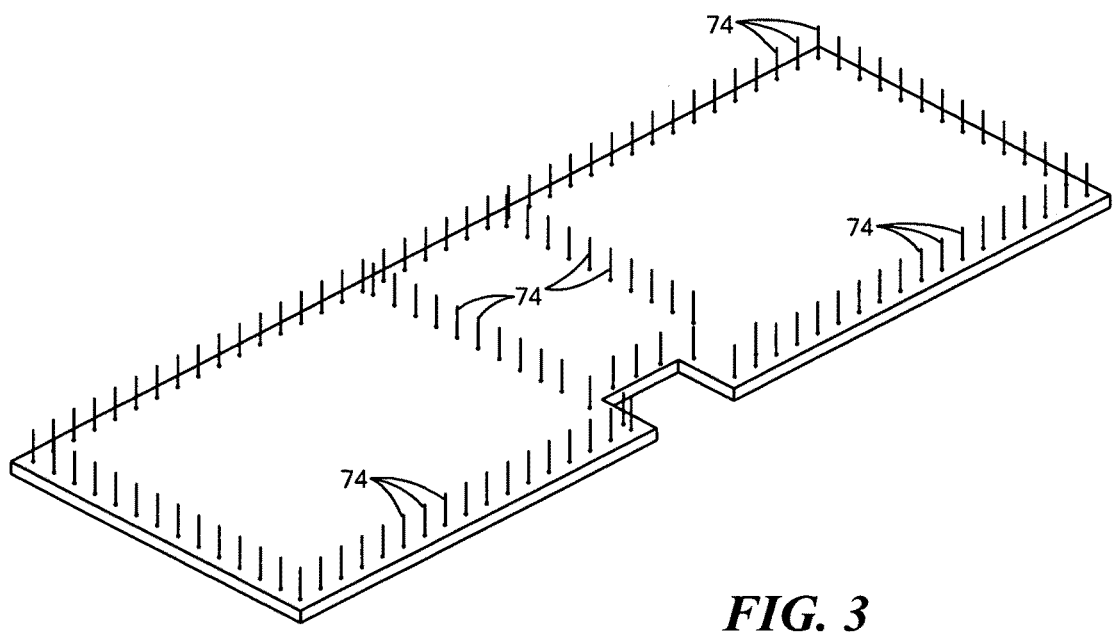
FIG. 3 is a three-dimensional top view showing one example of threaded inserts in place in the inserts shown in FIG. 2.
Figure 4A:
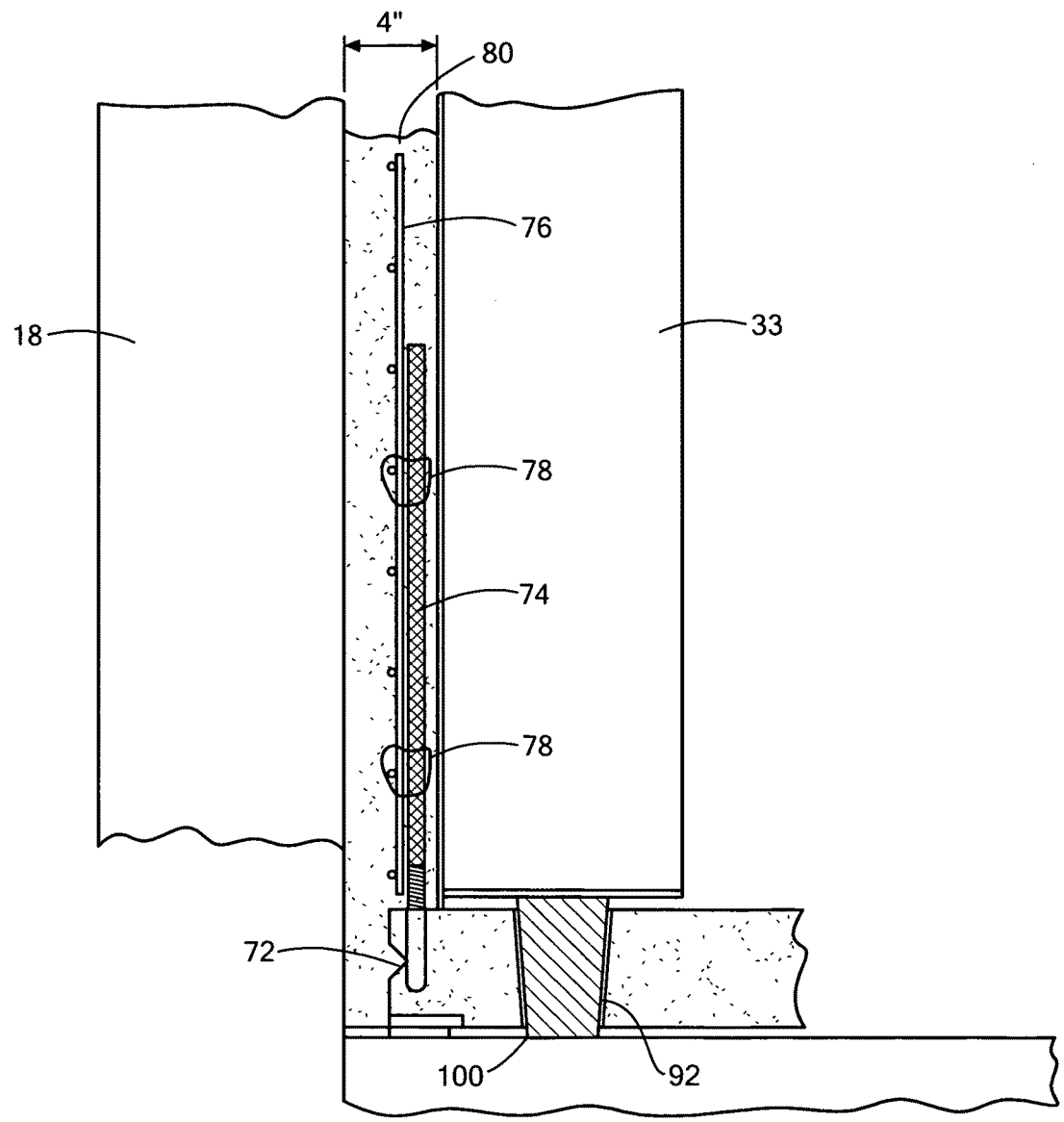
FIG. 4A is a schematic side view showing in further detail one embodiment of the structure of one of threaded rods and one of the inserts shown in FIGS. 2 and 3.
Figure 4B:
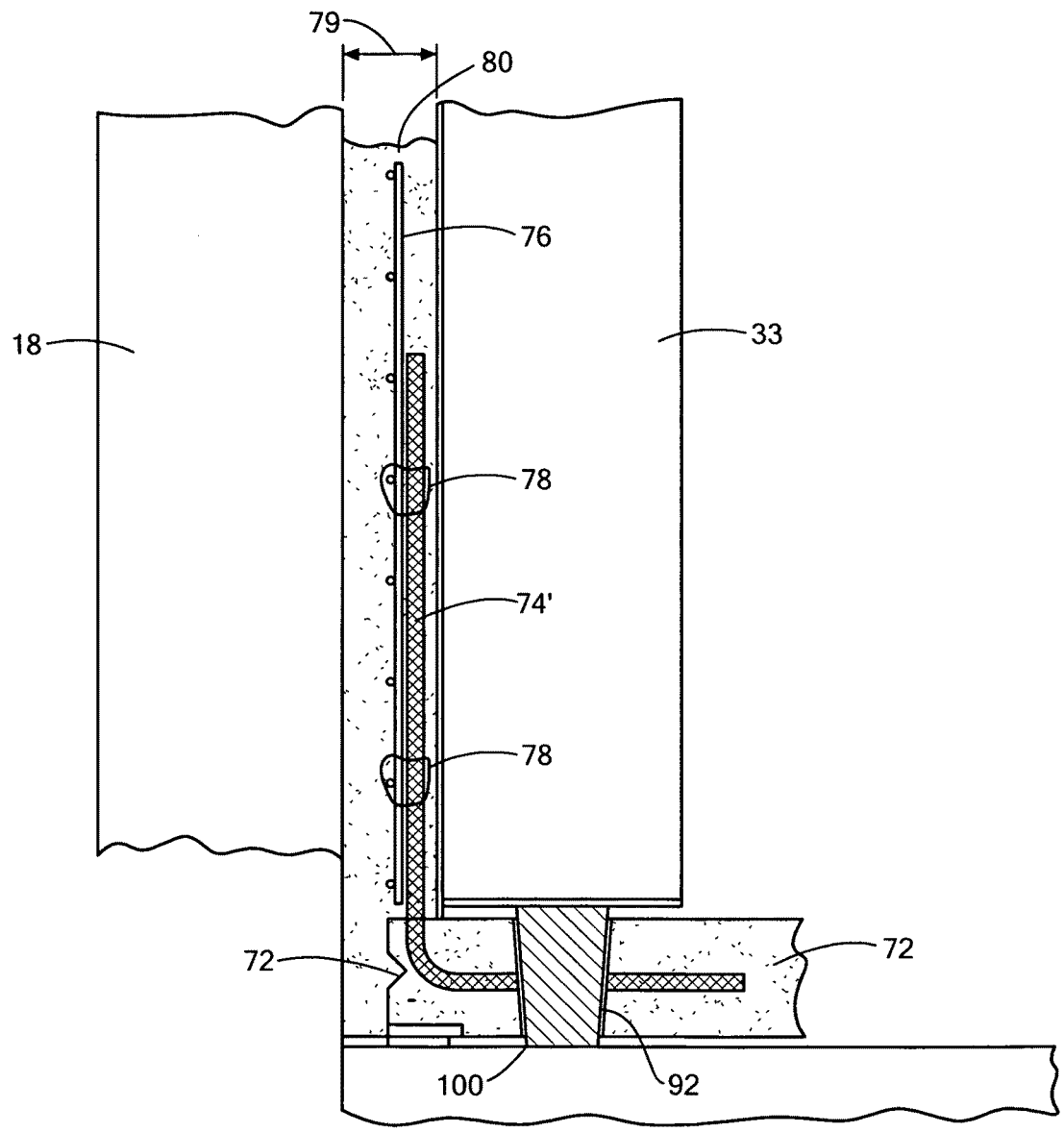
FIG. 4B is a schematic side view of another embodiment of rods embedded into a floor slab and extending up and into a concrete wall in accordance with this invention.
Figure 4C:
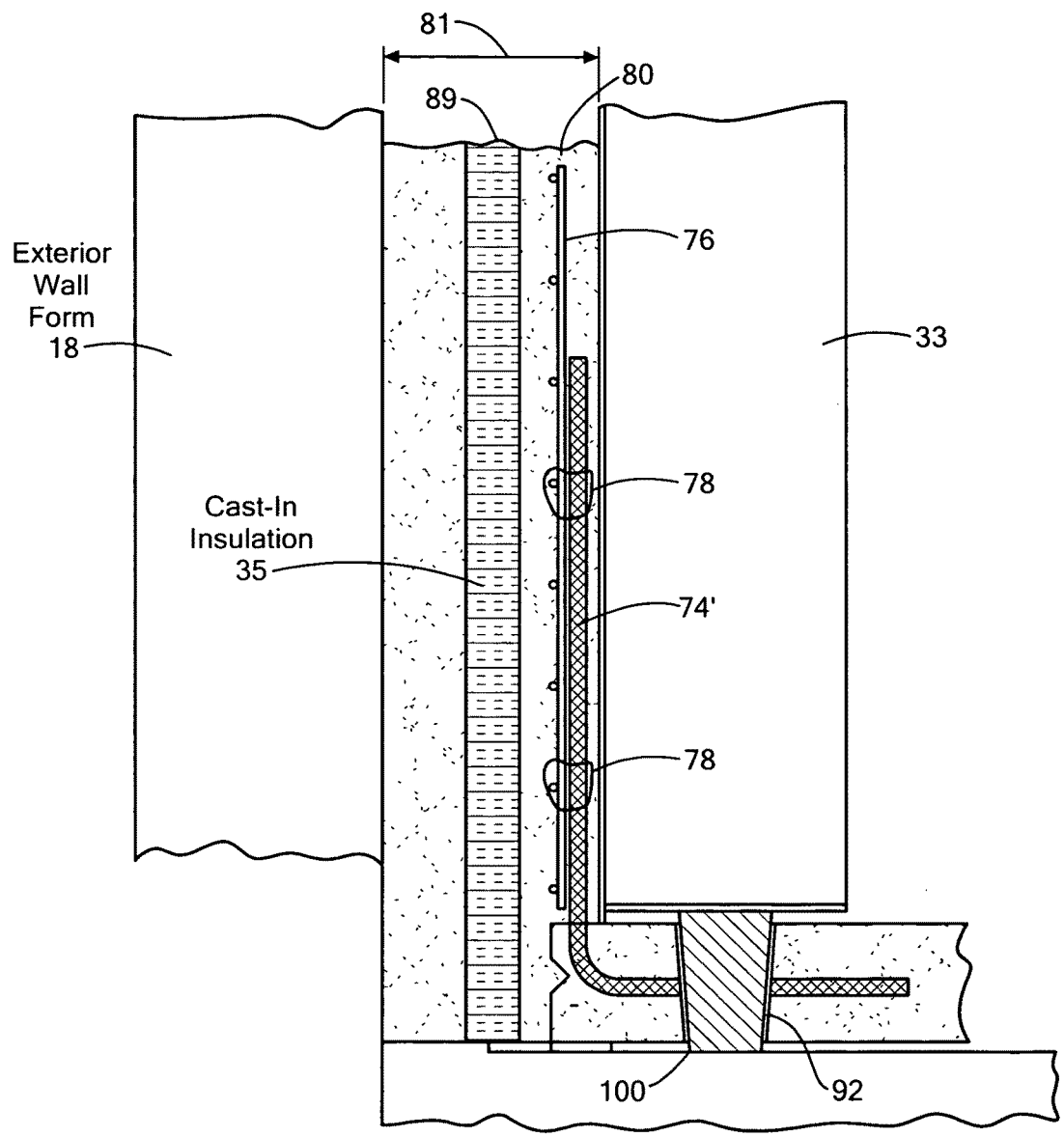
FIG. 4C is a schematic side view of another embodiment of rods embedded into a floor slab and extending up and into a concrete wall in accordance with this invention.

In one design, floor slab 70, FIG. 2, may be been cast with female inserts 72 that 10 receive threaded rods 74, FIG. 3. Rods 74 are typically made of steel or a similar type material. FIG. 4A shows in further detail one example of the structure of one of threaded rods 74 in place in female insert 72. Rods 74 provide for attachment of a prefabricated wire mesh cage 110, FIG. 9, discussed in further detail below, as shown at 78, FIG. 4A. The prefabricated cage provides wall reinforcement to the concrete walls of the concrete 15 modular housing unit, e.g. concrete wall 80. In other example, rods 74', FIG. 4B may be incorporated into floor slab 72 and extend upwardly as shown. Similarly, rods 74' may provide for attachment of a prefabricated wire mesh cage 110, FIG. 9, as shown at 78, FIG. 4B, discussed in further detail below. In the example, concrete wall 80 may have a minimum thickness of about 3", as indicated at 79. In yet other example, rods 74', FIG. 4C may be incorporated into floor slab 72 and extend upward as shown. Similar as discussed above with reference to FIG. 4B, rods 74' provide for attachment of a prefabricated wire mesh cage 110, FIG. 9A, a shown at 78. In this example, concrete wall 80 has a maximum thickness of about 10", as indicated at 89. Insulation 89 may be placed in wall 80 before the concrete is poured.

Figure 5:
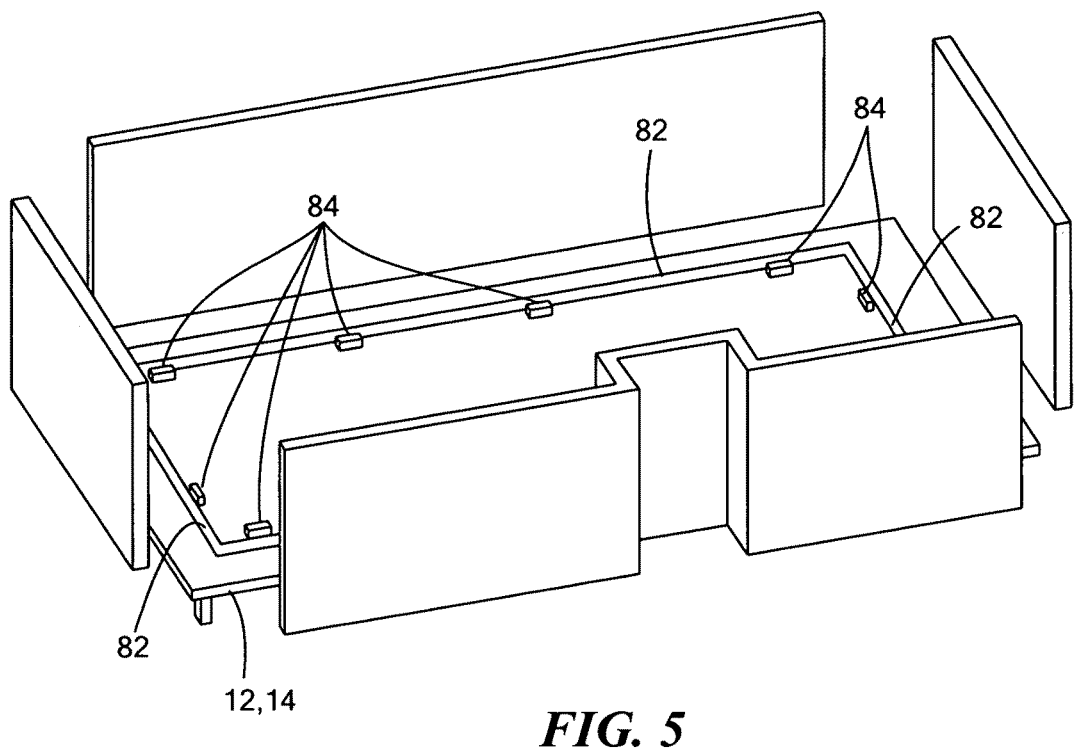
FIG. 5 is a schematic front view showing one example of a steel base runner and a plurality of pads used to align the previously poured floor slab on the deck platform shown in FIG. 1.

Each of deck platforms 12 and 14, FIG. 1, preferably include strategically located support 82, FIG. 5, e.g., a continuous steel base runner attached (e.g., welded) to each of deck platforms 12, 14, as shown. Deck platforms 12 and 14, FIGS. 1 and 5, each also preferably include rubber gaskets 84, FIG. 5. Support 82 and gaskets 84 position the floor slab at the correct position on the deck platform, ensure the floor slab is level, provide support, and cushion the floor slab to prevent any damage thereto. The placement of the floor slab on the deck platform is important to the entire production process. FIG. 1 shows one example of floor slab 70 in desired position on deck platform 12 on top of support 82 and rubber gaskets 84, FIG. 5.

Figure 6:
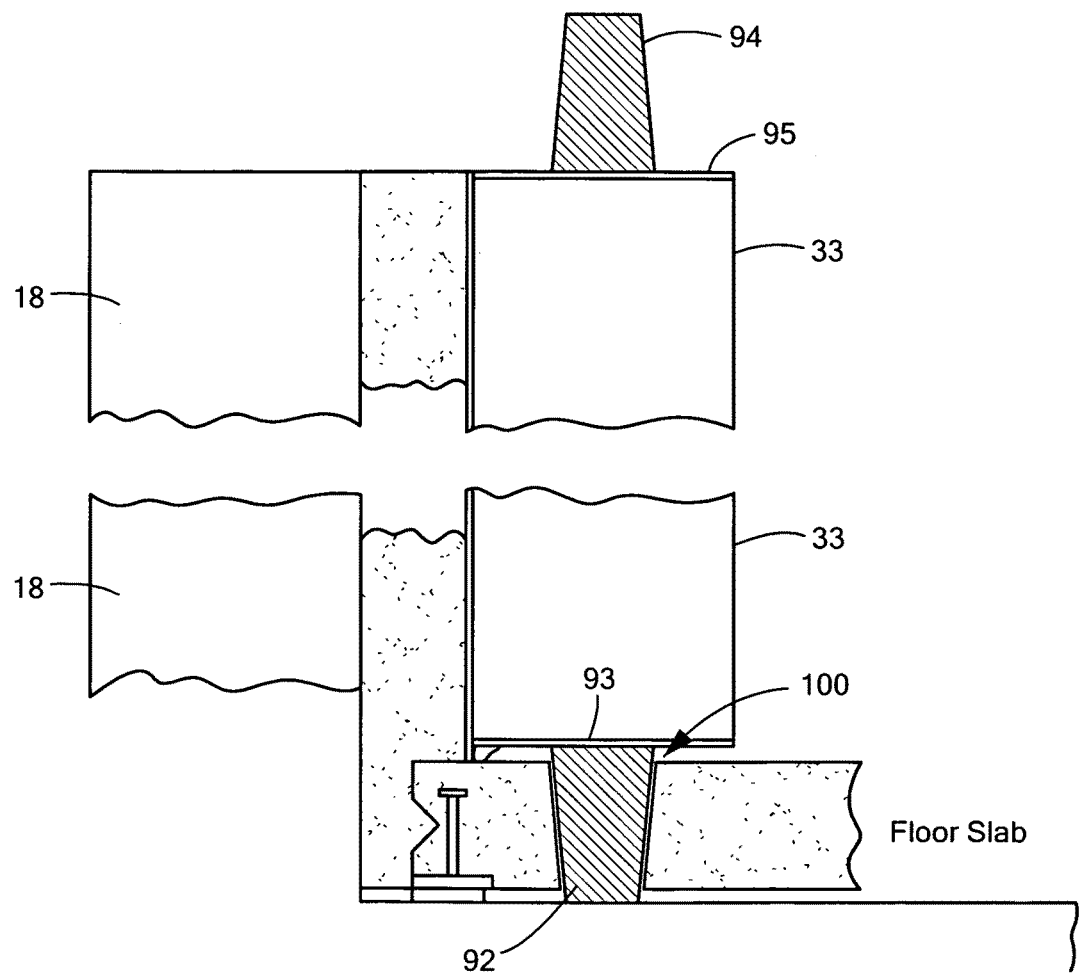
FIG. 6 is a schematic side view showing one example of an alignment pin in place in a slot in the floor slab and also showing an alignment pin located on the top of one of the wall forms of the cores shown in FIG. 1.

Once floor slab 70, FIG. 1, is in the correct position on deck platform 12, core 32, and/or cores 34 and 36 with all their respective corner slugs in the elevated position are individually (or collectively) placed on floor slab 70 by matching an alignment pin which may be located at the bottom of each of the core walls of each of cores 32-36 with an appropriate slot that has been precast in floor slab 12. Preferably, each of the core walls of cores 32-36 includes an alignment on the bottom surface thereof and an alignment pin 94 on the top surface thereof. For example, core wall 33, FIG. 1, includes alignment pin 92, FIG. 6, on bottom surface 93 and alignment pin 94 on top surface 95. Concrete floor slab 70, FIG. 1, preferably includes precast slots 100, FIGS. 2 and 6, which are designed to match each of the alignment pins on each of the core walls of each of the plurality of cores. FIG. 6 shows one example of alignment pin 92 in place in one of slots 100. In other designs, a hydraulic/pneumatic latching system may be used to secure the inner core walls to the floor slab. Such a design would typically be operated from the top of the wall forms of the cores.

Figure 7A:
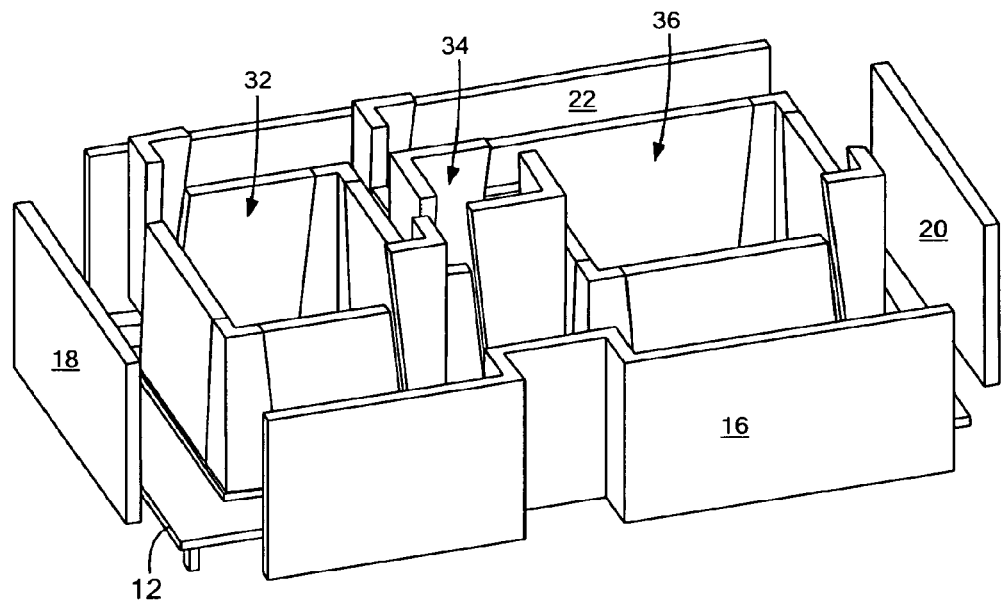
FIG. 7A is a three-dimensional front view showing one example of the plurality of cores of one deck platform shown in FIG. 1 moved in place on the left-hand deck platform and also showing some of the corner slugs in the elevated position.
Figure 7B:
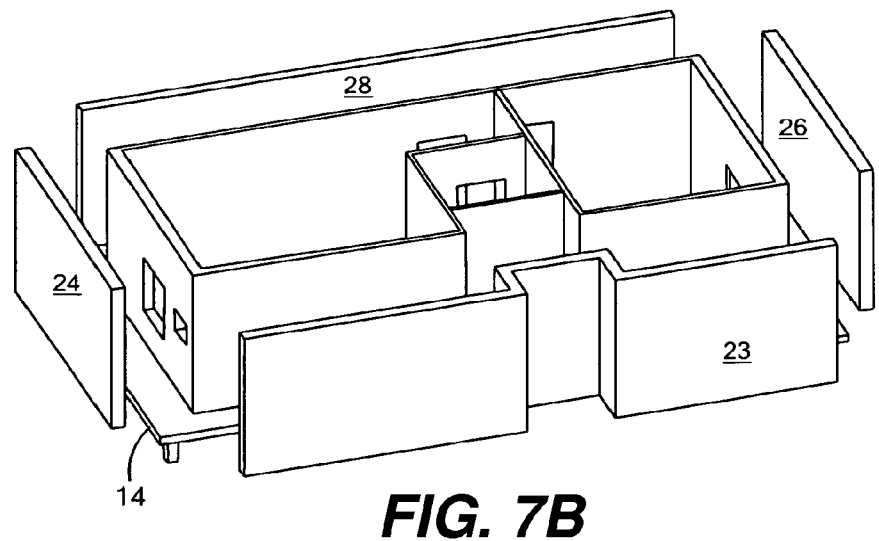
FIG. 7B is a three-dimensional front view of another deck platform.
Figure 8A:
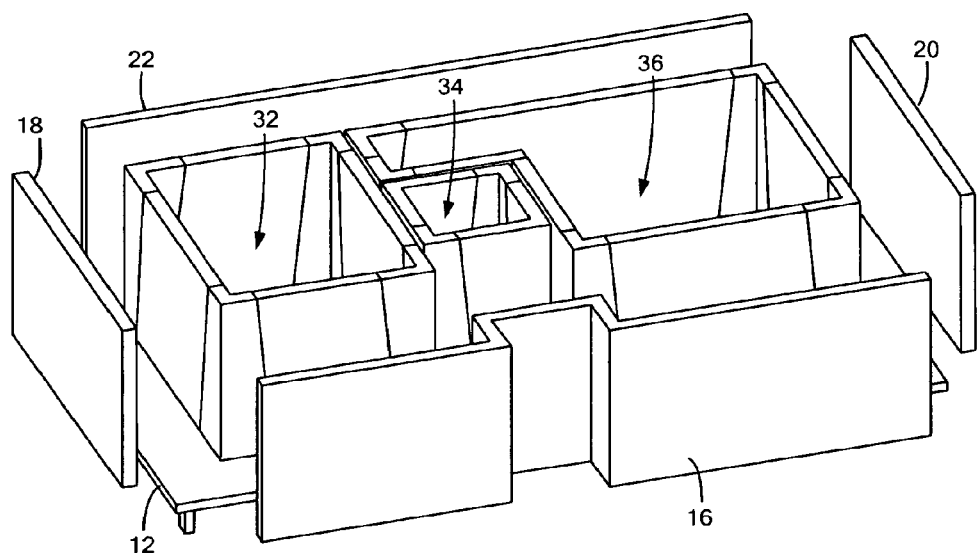
FIG. 8A is a three-dimensional front view showing all the corner slugs shown in the deck platform of FIG. 7A in the expanded position.
Figure 8B:
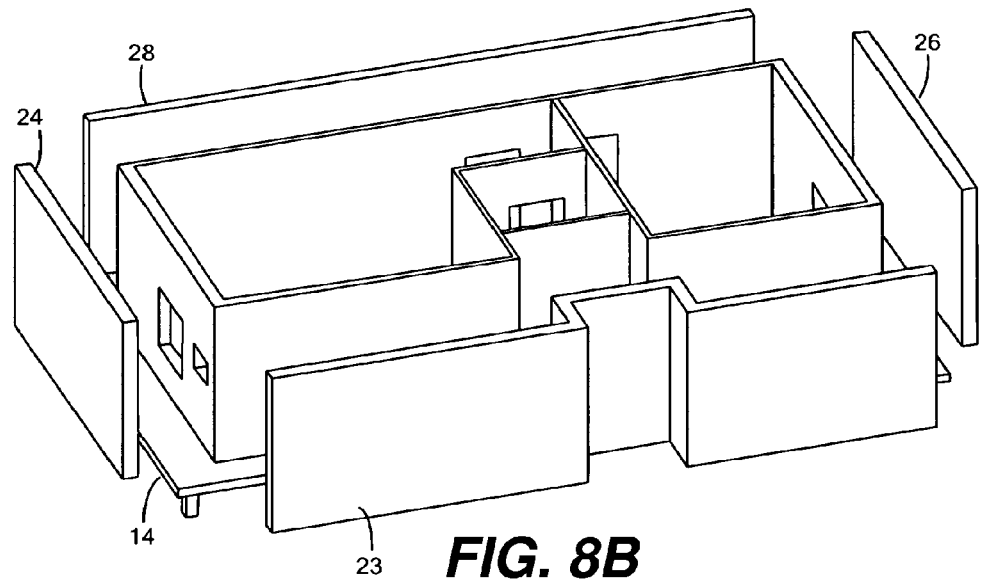
FIG. 8B is a three-dimensional front view of the other deck platform.

FIG. 7A shows one example of cores 32, 34, and 36 in the place in a desired position on floor slab 70 on deck platform 12 using the alignment pins and slots as discussed above. FIG. 3 also shows completed right-hand module 31 manufactured previously in place on right deck platform 14. As shown for illustrative purposes only, some of the corner slugs of cores 32-36 in FIG. 7A are shown in the elevated position and some of the corner slugs are shown in the down or expanded position. However, at this point in the production process, all the corner slugs are in the elevated position. Then, all the corner slugs of each of cores 32-36 are then moved to the expanded position, as shown in FIG. 8A.

Figure 9A:
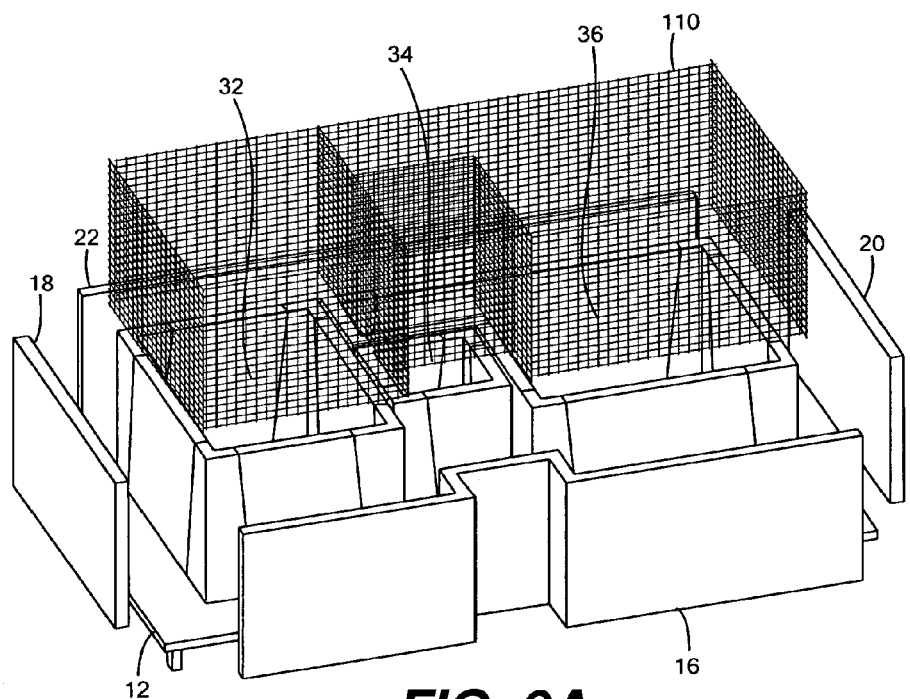
FIG. 9A is a three-dimensional front view showing one example of a fabricated cage being positioned in place about the plurality of cores shown in the deck platform of FIG. 8A.

Next, in this example, reinforcing cage 110, FIG. 9A, e.g., a wire mesh reinforcing cage, may be placed about cores 32, 34, and 36. Cage 110 may be secured to floor slab 70 by attaching it to male inserts 74, FIG. 4, e.g., using wire ties as shown at 78.

Figure 10A:
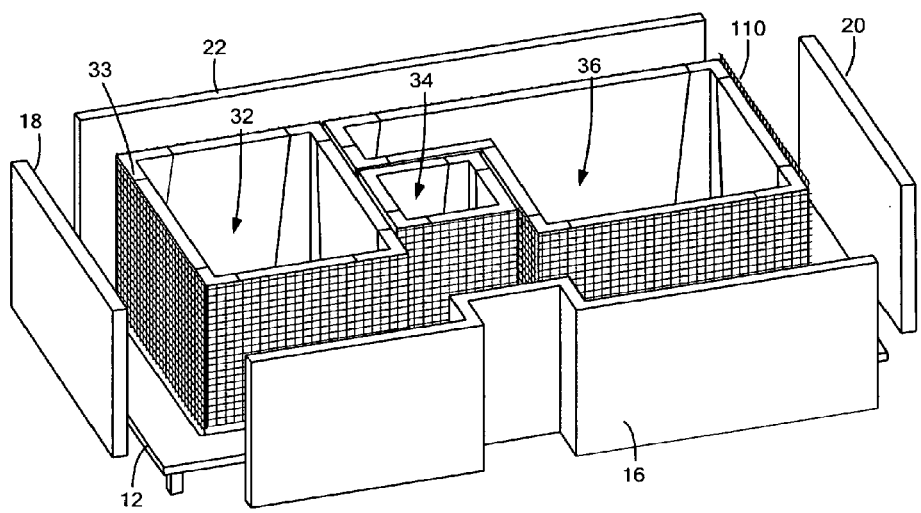
FIG. 10A is a three-dimensional front view showing the fabricated cage in its final position about the plurality of cores of the deck platform.
Figure 10B:
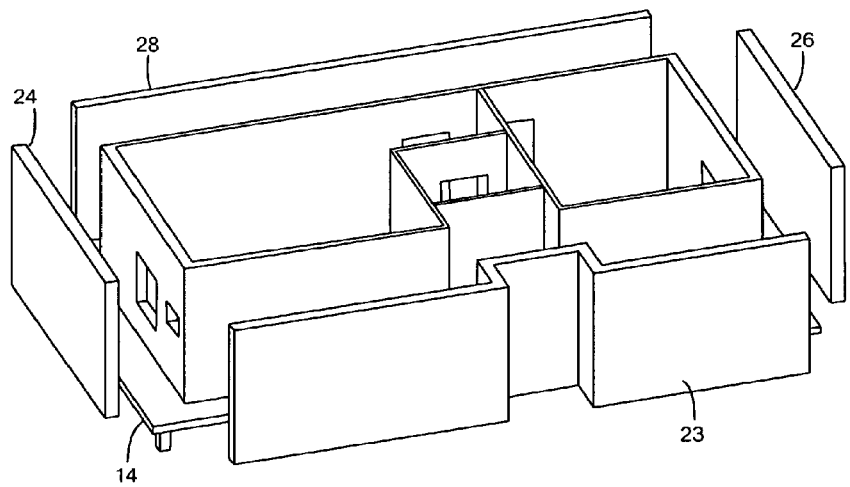
FIG. 10B is a three-dimensional front view of the other deck platform.
Figure 11A:
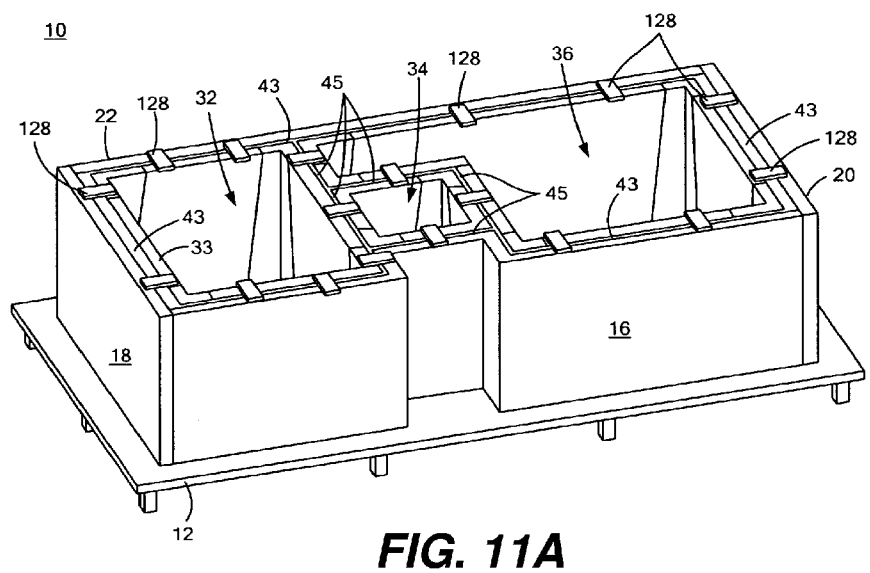
FIG. 11A is a three-dimensional front view showing one example of exterior wall forms in the closed position and the deck platform of the system of one embodiment of this invention ready to receive concrete.
Figure 11B:
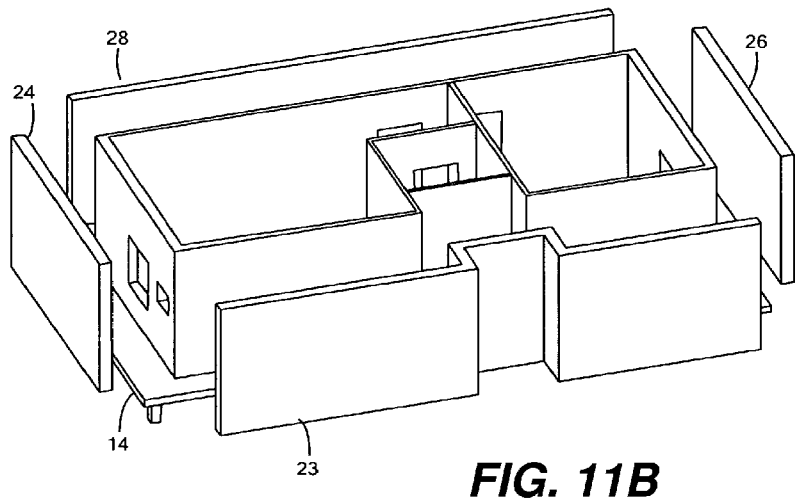
FIG. 11B is a three-dimensional front view of the other deck platform.

FIG. 10A shows cage 110 in place about cores 32, 34, and 36. Exterior wall forms 16, 18, 20, and 22, currently in the open position, are then moved to the expanded position, as shown in FIG. 11A to form the appropriate wall space thickness between wall forms 16-22 and the exterior core walls of cores 32-36 and with space 45 between adjacent cores 32, 34, and 36. The distance between each of wall forms 16-22 and the core walls and corner slugs of core 32-36 and the distance between the core walls and corner slugs of the adjacent cores provide the needed wall thickness to accommodate the design of a desired concrete modular housing unit, in this example, a left-hand concrete modular housing unit.

Figure 12:
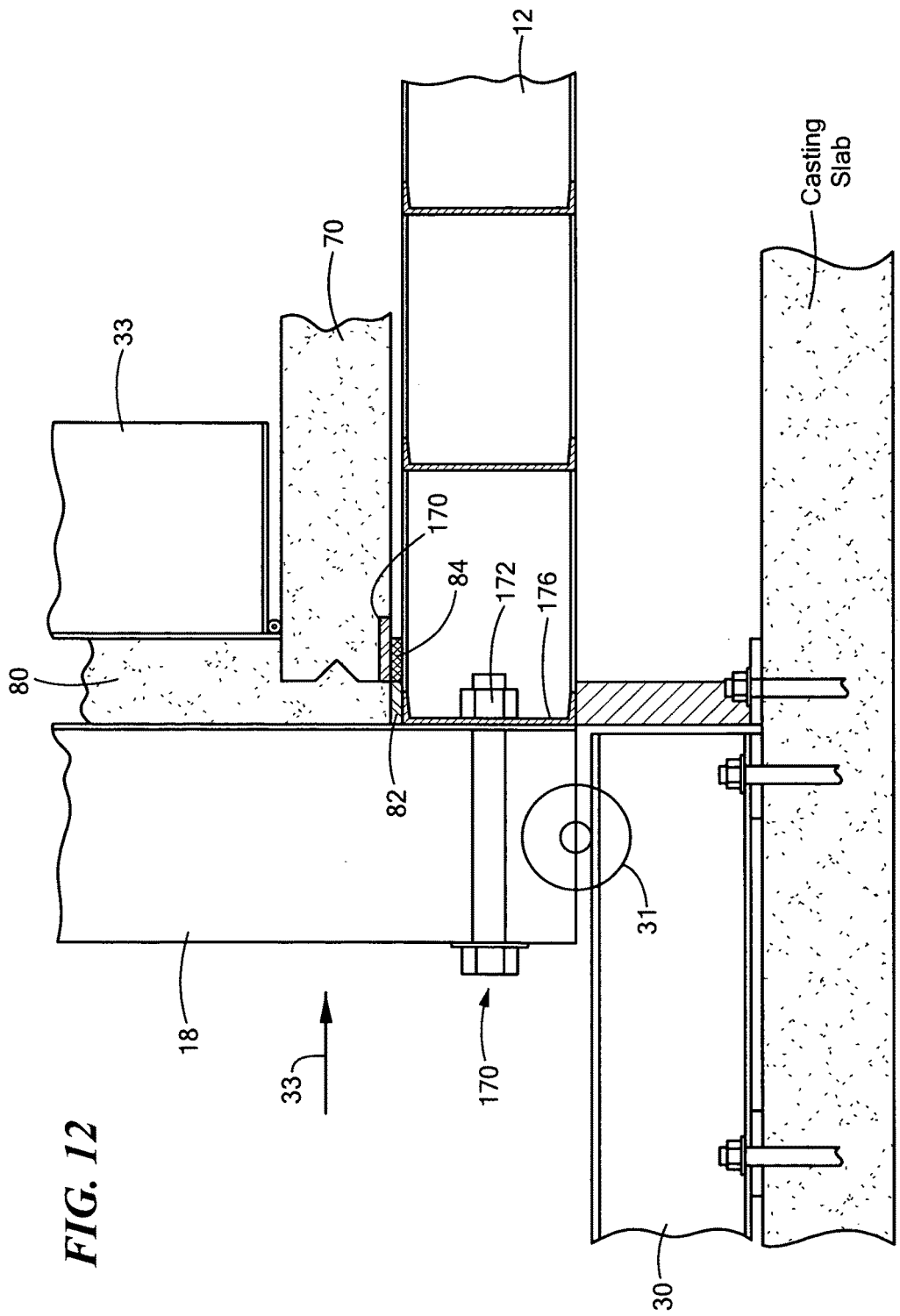
FIG. 12 is a schematic side view showing in further detail one embodiment of the connection between an outer form wall and the deck platform of this invention.

In one embodiment, in order to position each of exterior wall forms 16-22, FIG. 10A to the correct position proximate the core walls of cores 32-36, FIG. 11A, each of wall forms 16-22 on deck platform 14 preferably move on tracks 30, FIG. 1, until they butt up against the end of deck platform 12. For example, exterior wall form 18, FIG. 10A, is moved to the appropriate position proximate wall 33, FIG. 11A, of core 32 by rolling on track 30, FIG. 12, via wheel 31 in direction 33 until it butts up against face 176 of deck platform 12. Exterior wall form 18 is then secured in place using bolt assembly 170, e.g., bolt 171 and nut 172. FIG. 12 also shows in further detail support 82 and rubber gasket 84, discussed above with reference to FIG. 5, used to position floor slab 12 on deck platform 12. Floor slab 12 also preferably includes a plurality of embeds, e.g., embed 170 which stabilize and level floor slab 70 on deck platform 12 to ensure floor slab 70 is at the appropriate elevation. FIG. 13A shows one example of a plurality of embeds 170 which have been precast in floor slab 12. FIG. 13B shows in further detail one example of the structure of insert 72 and rod 74. FIGS. 13C and 13D each show in further detail one example of the bolt assembly and embeds cast into a floor slab.

Figure 14:
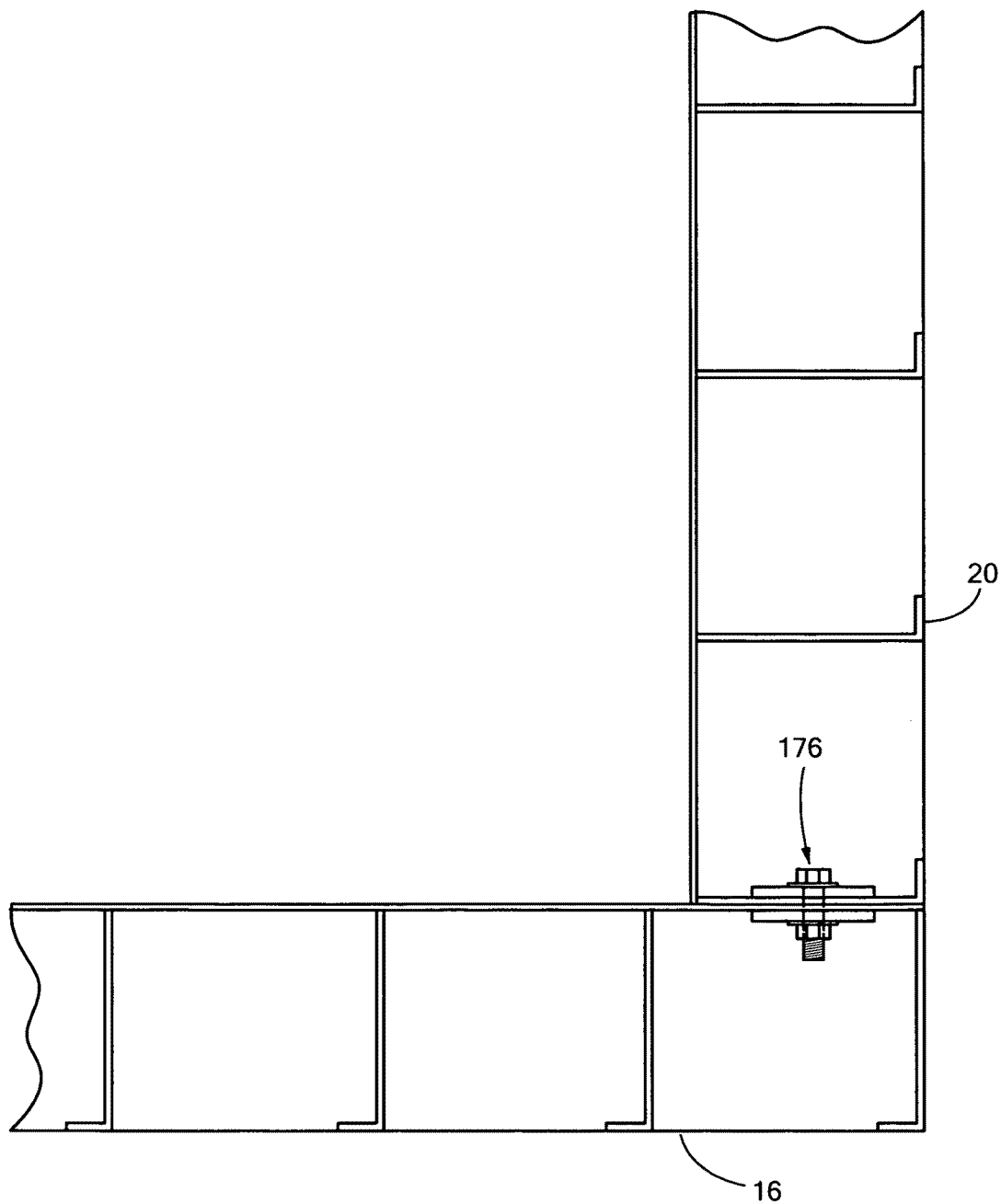
FIG. 14 is a schematic top view showing one example of the connection between two adjacent wall forms.

Similarly as discussed above, each of exterior wall forms 16, 20, and 22, FIG. 10A, are also moved into the desired position proximate the core walls of cores 32-36, as shown in FIG. 11A, using tracks 30, FIGS. 1 and 12, and secured to deck platform using a bolt assembly. After all the exterior wall forms 16-22 are moved to the expanded position, they are typically secured to each other using a bolt assembly, e.g. bolt assembly 176, FIG. 14 securing wall forms 16 and 20. Preferably, exterior wall forms 16-22, FIG. 11A, are latched to the core walls of cores 32-36 and the core walls of cores 32-36 are latched to adjacent respective core walls using latching connectors 128, FIG. 11A. In other examples, the wall forms may be latched together by a hydraulically actuated latching mechanism. Accelerated precast modular manufacturing system 10 is now ready to receive the concrete.

Figure 15A:
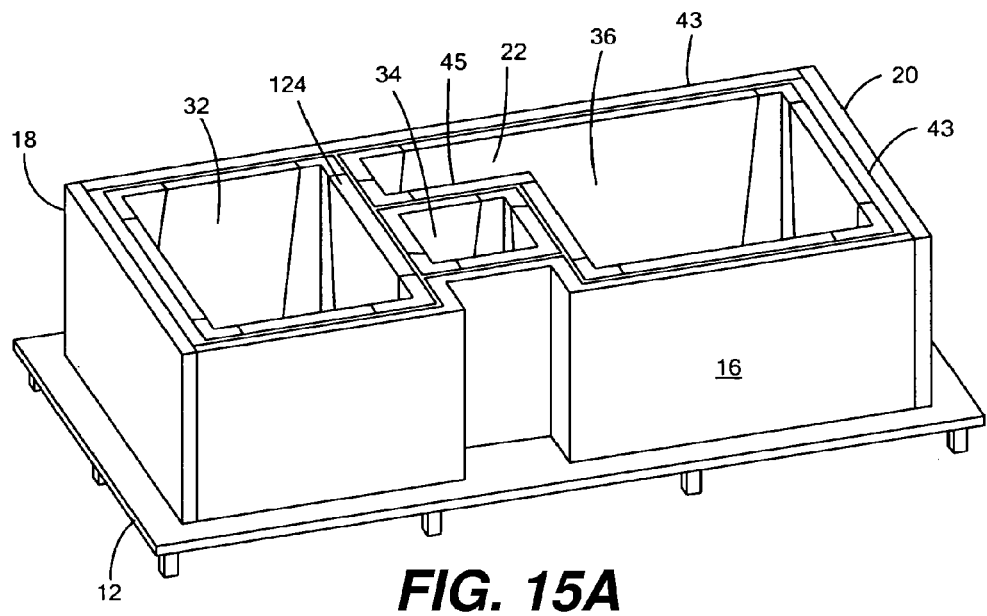
FIG. 15A is a three-dimensional front view showing one example of a deck platform with concrete poured in the wall spaces between the cores and the outer wall forms and the wall space between adjacent cores.
Figure 16A:
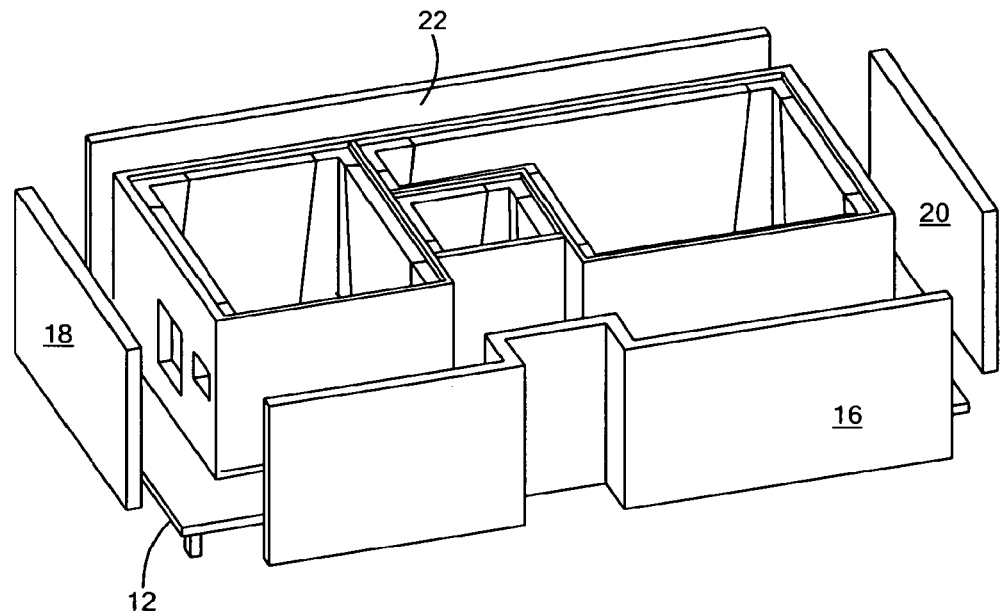
FIG. 16A is a three-dimensional front view showing the exterior wall forms shown in the deck platform of FIG. 15A now in the open position.
Figure 16B:
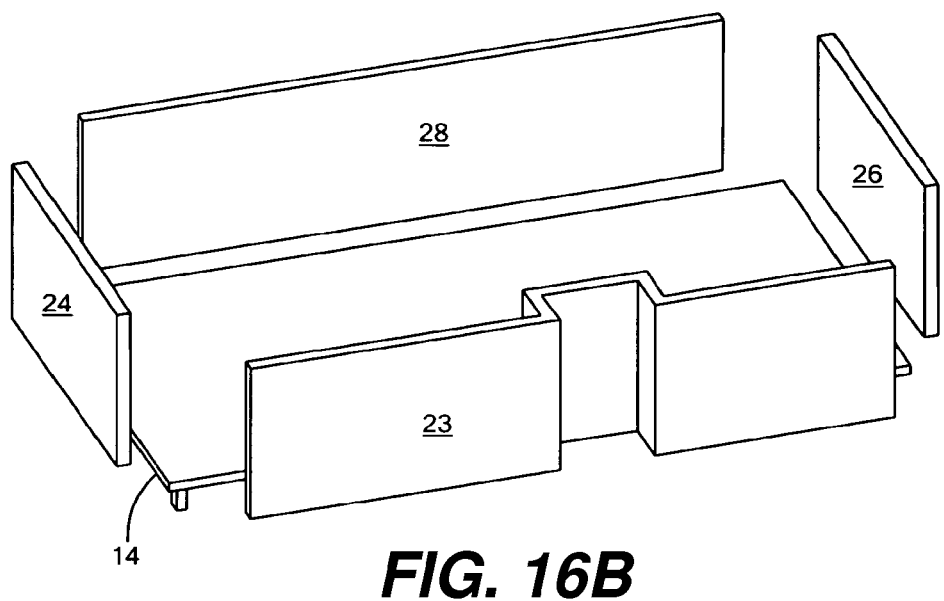
FIG. 16B is a three-dimensional front view of the other deck platform.
Figure 17A:
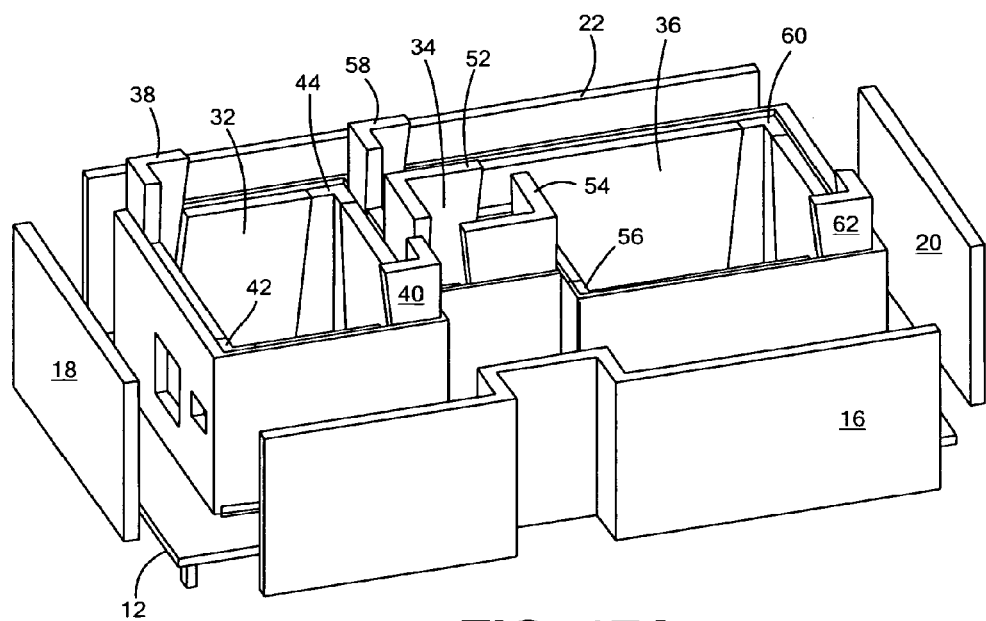
FIG. 17A is a three-dimensional front view showing one example of some of the corner slugs of the cores shown in the deck platform of FIG. 16A moved to the elevated position.
Figure 17B:
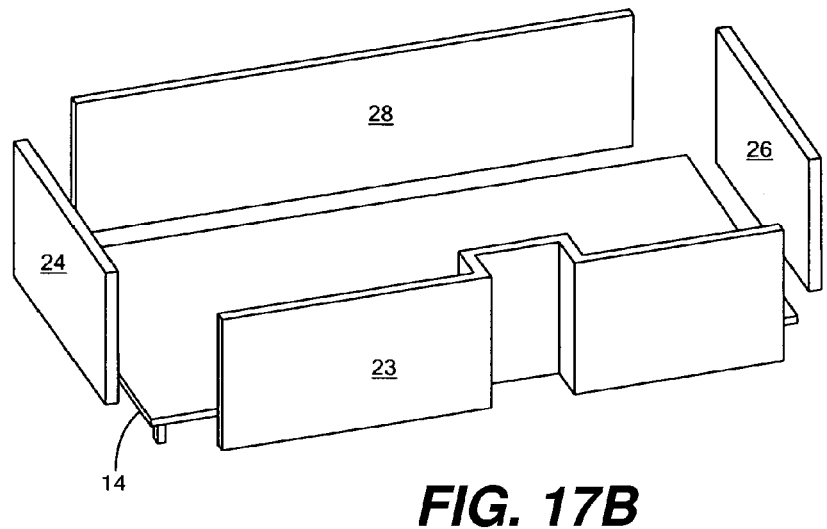
FIG. 17B is a three-dimensional front view showing the other deck platform.

Wet concrete is then poured into the wall space 43, FIG. 11A, between wall forms 18-22 and the core walls of cores 32-36 and wall space 45 between adjacent core walls of cores 32-36. Latching connectors 128 are removed as shown in FIG. 15A. The wet concrete is allowed to set until initial set strengths have been achieved (e.g., partially cured), typically in about two to three hours. Outer wall forms 16-22 are then moved to the open position, as shown in FIG. 16A, to separate wall forms 16-22 from the partially cured concrete. Then, corner slugs 38, 40, 42, and 44, FIG. 17A, of core 32, corner slugs 52 and 54 of core 34 and corner slugs 56, 58, 60 and 62 of core 36 are moved to the elevated position. This causes the interior of cores 32-36 to collapse within each core and allows enough space for each of cores 32-36 to be removed from deck platform 12. Although FIG. 17A shows some of the corner slugs in the elevations position and some in the expanded position, this is for illustrative purposes only, as at this point in the production process, all of corner slugs are preferably in the elevated position. Each of cores 32-36 is then individually removed from deck platform 12, e.g., using a mobile crane or similar type device and placed on floor 15, FIG. 18. Left-hand concrete modular housing unit 140 manufactured in accordance with this invention is still curing but has achieved sufficient strength to stand on its own and allow cores 32-36 to be removed. After concrete modular housing unit 140 has cured, it will be removed from deck platform 12.

Because cores 32-36 can be removed from deck platform 12 after initial set strengths of the wet concrete have been achieved and the concrete is still curing in concrete modular housing unit 140, e.g., in about 2 to 3 hours, the system and method for rapid manufacturing of concrete modular housing units of one or more embodiments of this invention can use core 32 and/or cores 34 and 36 to manufacture another concrete modular housing unit, e.g., a right-hand concrete modular housing unit which is a mirror image of concrete modular housing unit 140, another left-hand concrete modular housing unit, or any desired concrete modular housing unit, while concrete modular housing unit 140 is still curing to its final strength. This significantly saves time and increase the manufacturing process of concrete modular housing units.

Figure 18:
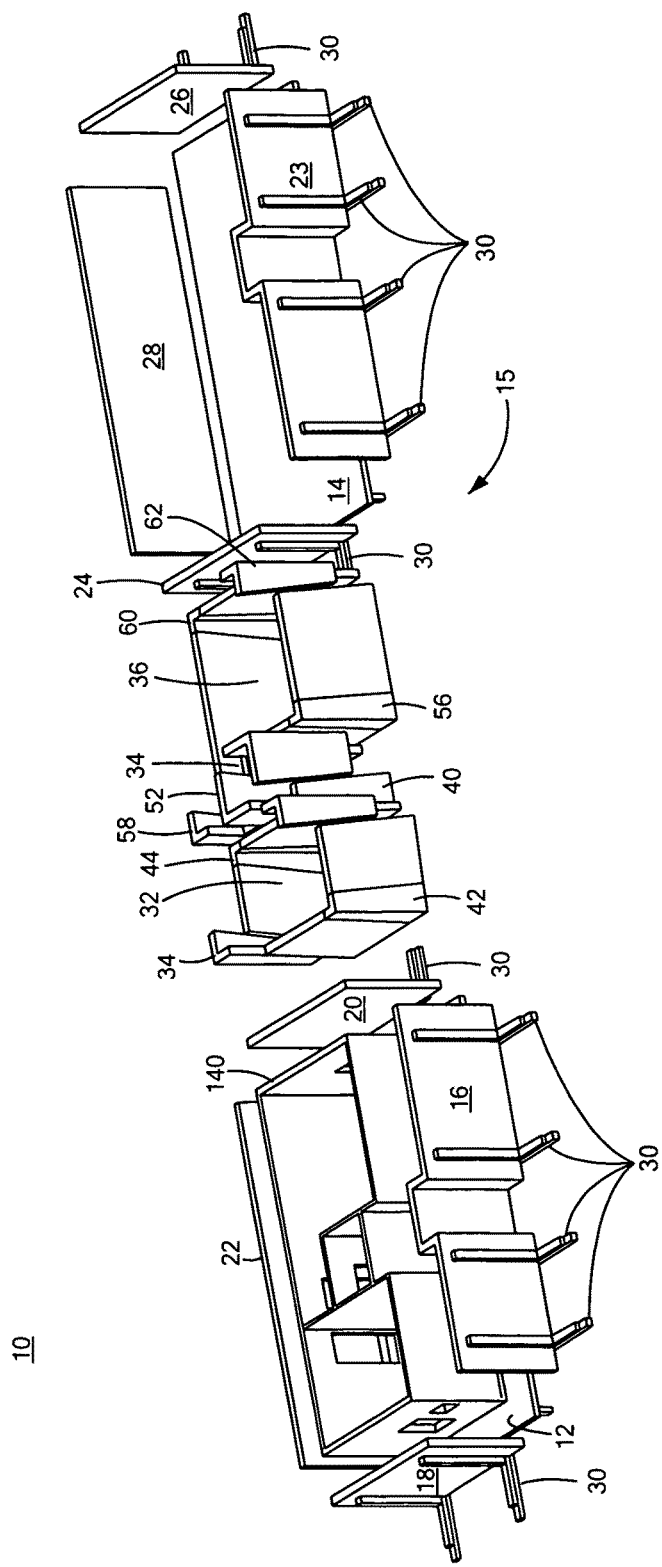
FIG. 18 is a three-dimensional front view showing the plurality of cores removed from the left deck platform and now in position between the right and left deck platforms with some of the corner slugs shown in the evaluated position.
Figure 19:
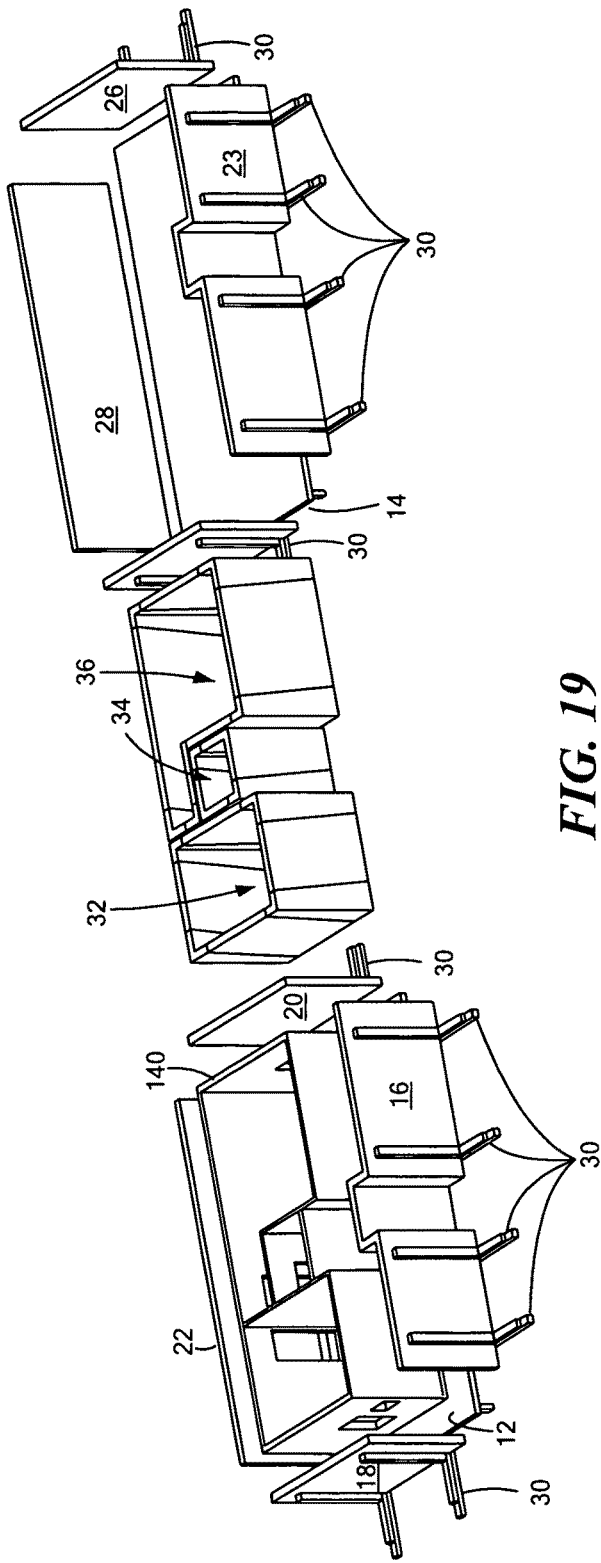
FIG. 19 is a three-dimensional front view showing the plurality of cores shown in FIG. 18 with the corner slugs in the expanded position.
Figure 20:
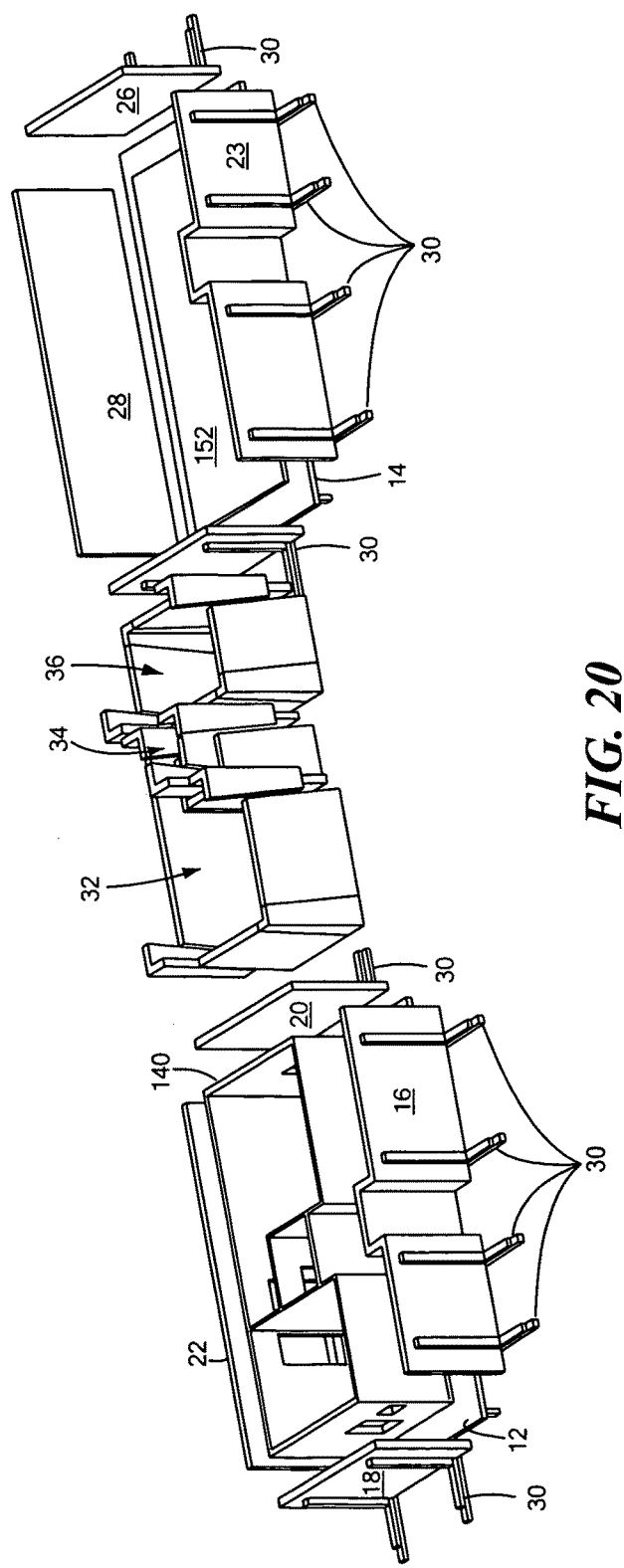
FIG. 20 is a three-dimensional front view showing a previously poured concrete slab in position on the right deck platform.
Figure 21A:
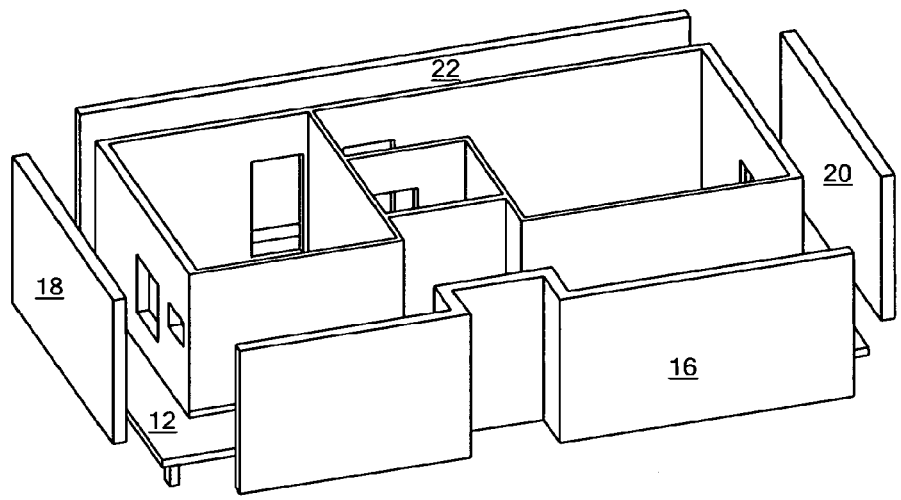
FIG. 21A is a three-dimensional view showing one deck platform.
Figure 21B:
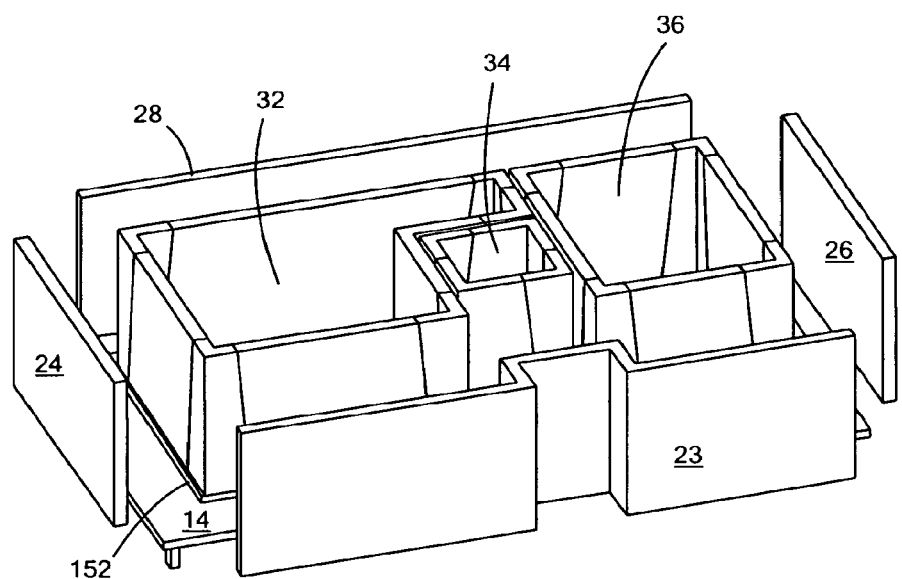
FIG. 21B is a three-dimensional front view showing the other deck platform with the plurality of cores shown in FIG. 19 turned upside down and placed on the right deck platform to manufacture a righthand concrete modular housing unit and also showing the partially cured left-hand modular housing unit.

To do this, each of the elevated corner slugs 38, 40, 42, and 44 of core 32, FIG. 18, and/or corner slugs 52 and 54 of core 34 and/or corner slugs 56, 58, 60 and 62 of core 36 are moved from the elevated position to the expanded position, as shown in FIG. 19. Previously fabricated concrete slab 152 (floor slab), FIG. 20, manufactured similar as floor slab 70, FIGS. 1-3, is placed in the correct position on deck platform 14, FIG. 20, similar, as discussed above with reference to FIG. 5. Core 32, FIG. 20, and/or cores 34 and 36, each having all corner slugs in the expanded position, are then moved to deck platform 14, as shown in FIG. 21B. In this example, because a matching right-hand concrete modular housing unit is desired, each of cores 32-36 is turned upside down and placed in the correct position on floor slab 152 on deck platform 14 as shown in FIG. 21B. However, this is not a necessary limitation of this invention, as cores 32 and/or cores 34 and 36 need not be turned upside down prior to being placed on floor slab 152 and cores 32-36 placed on deck platform 14 could be used to build another left-hand concrete modular housing, or any type of desired concrete modular housing unit.

Figure 22A:
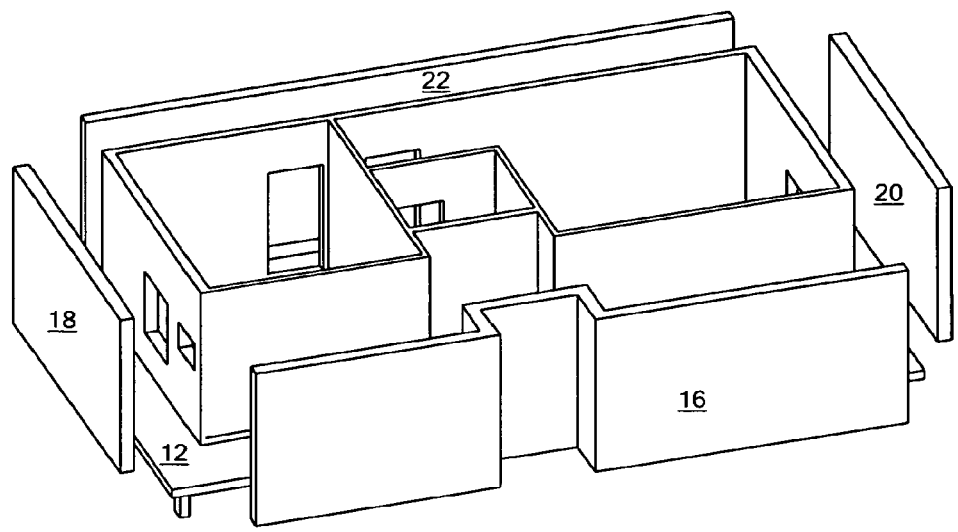
FIG. 22A is a three-dimensional view showing one deck platform.
Figure 22B:
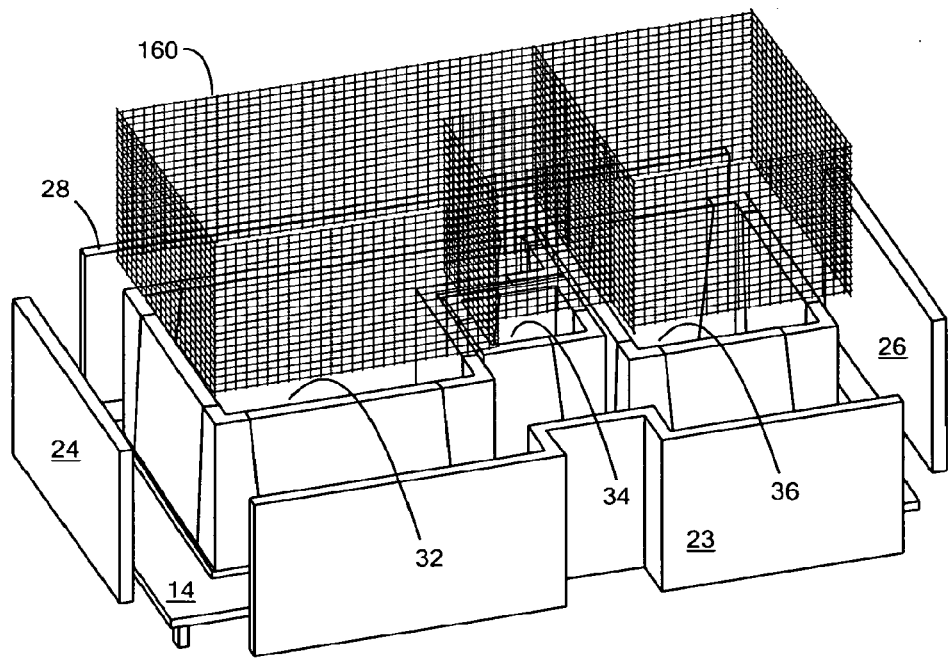
FIG. 22B is a three-dimensional front view showing one example of a fabricated cage being positioned in place about the plurality of cores with the other deck platform shown in FIG. 21B.

Similar as discussed above with reference to FIG. 9, reinforcing cage 160, FIG. 22B, e.g., a wire mesh reinforcing cage, may be placed about cores 32-36. Cage 160 may be secured to floor slab 152 by attaching it to male inserts as discussed above with reference to FIG. 4, e.g., using wire ties.

Figure 23A:
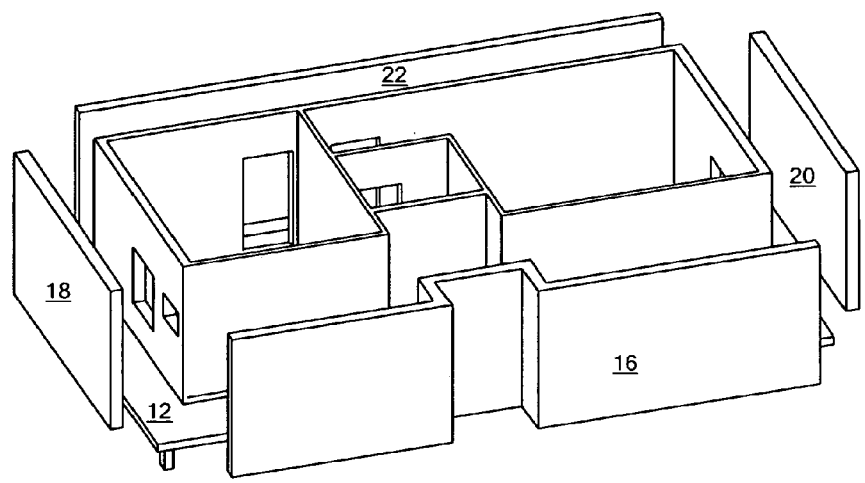
FIG. 23A is a three-dimensional view showing one deck platform.
Figure 23B:
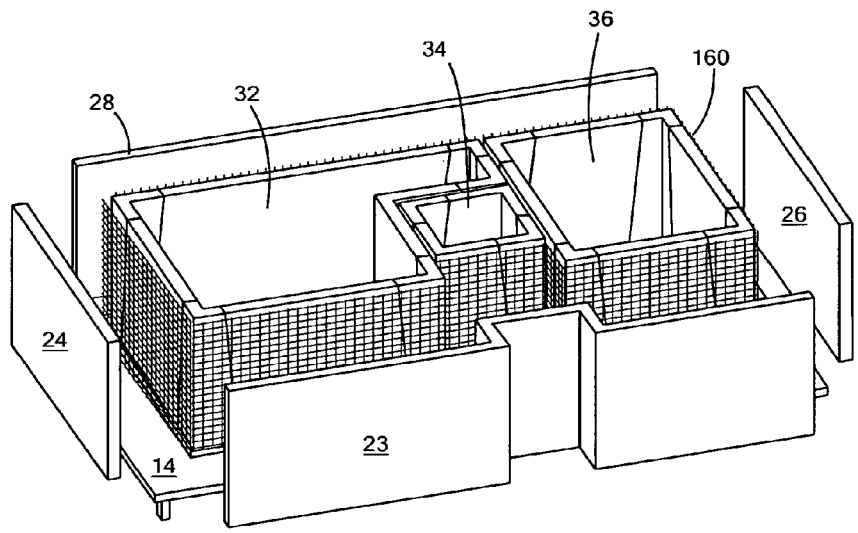
FIG. 23B is a three-dimensional front view of the other deck platform showing the fabricated cage in its final position about the plurality of cores.
Figure 24A:
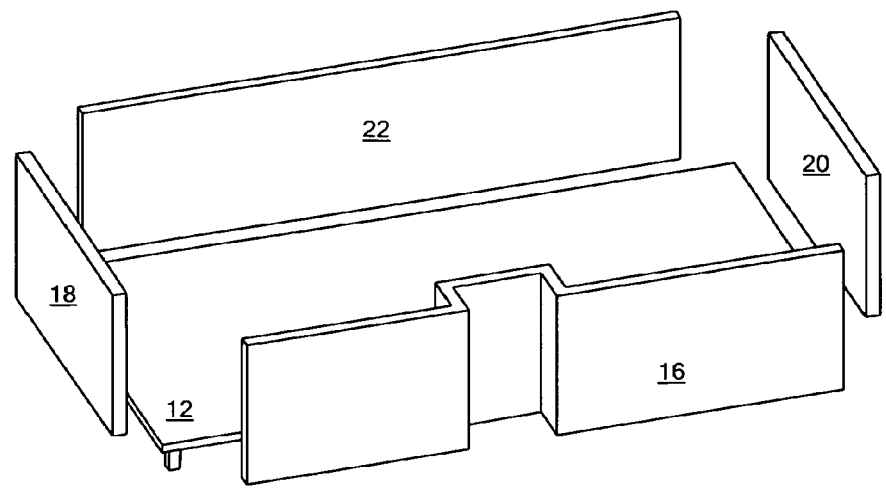
FIG. 24A is a three-dimensional view showing one deck platform.
Figure 24B:
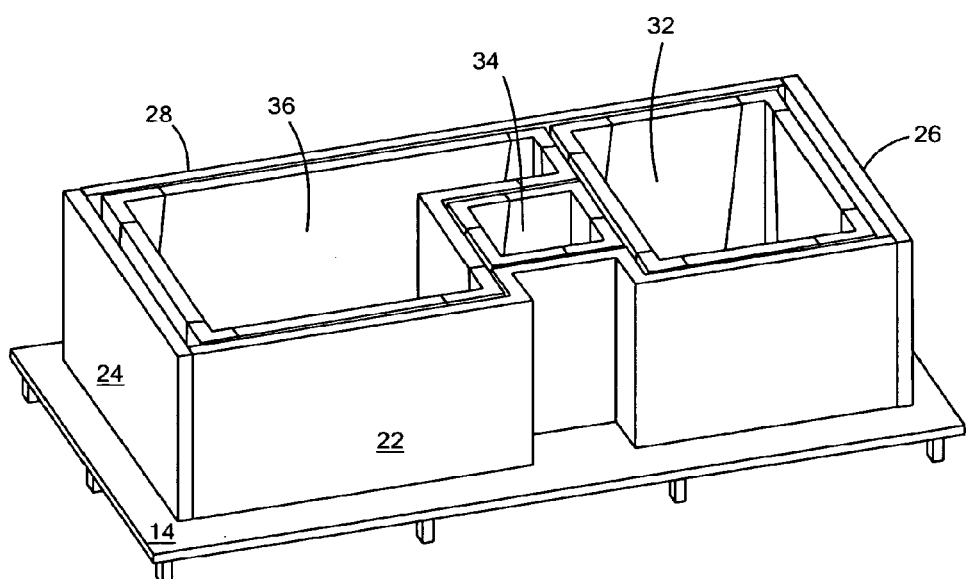
FIG. 24B is a three-dimensional front view of the other deck platform showing the exterior wall forms in the 10 closed position and the accelerated precast modular manufacturing system of this invention ready to receive the concrete.
Figure 25A:
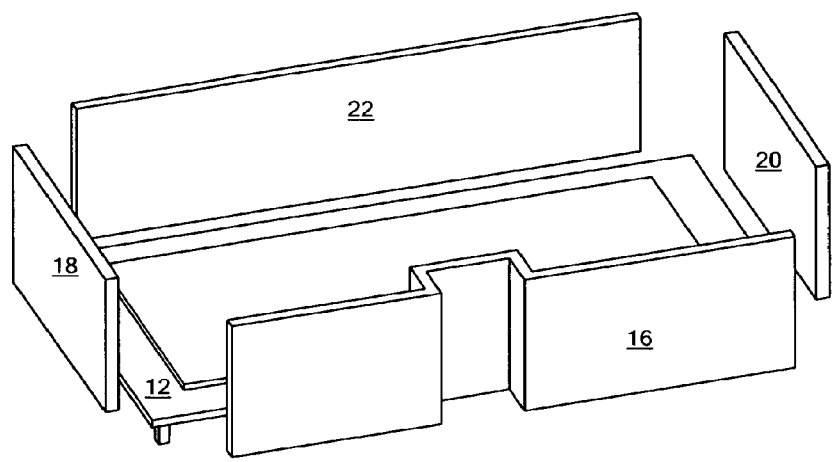
FIG. 25A is a three-dimensional view showing one deck platform.
Figure 25B:
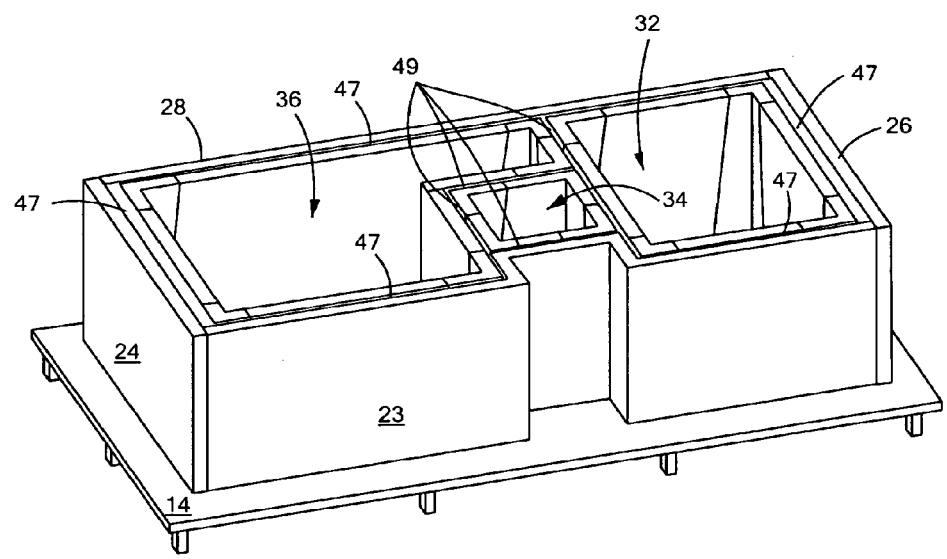
FIG. 25B is a three-dimensional front view of the other deck platform showing poured concrete in place between the wall space between the other wall forms and the cores and the wall space between adjacent cores.

FIG. 23B shows cage 160 in place about cores 32-36 on right deck platform 14. Exterior wall forms 23, 24, 26 and 28, currently in the open position, are then moved to the expanded position as shown in FIG. 24 to form the appropriate wall space 47, FIG. 25B, between wall forms 23-28 and the core walls of cores 32-36. Similar as discussed above, 5 the distance between each of wall forms 23-28 and the core walls of cores 32-36 which forms wall space 47 and the distance between the core walls and corner slugs of each of the adjacent core walls which forms wall space 49 provide the needed wall thickness to accommodate the design of a desired concrete modular housing unit, in this example a right-hand concrete modular housing unit. After wall forms 23-28 are positioned to the 10 desired position proximate cores 32-36, they are preferably attached to each other and to the cores 32-36 using a securing device as described above with reference to FIGS. 10A, 11A, 12, 13A-D, and 14.

Figure 15B:
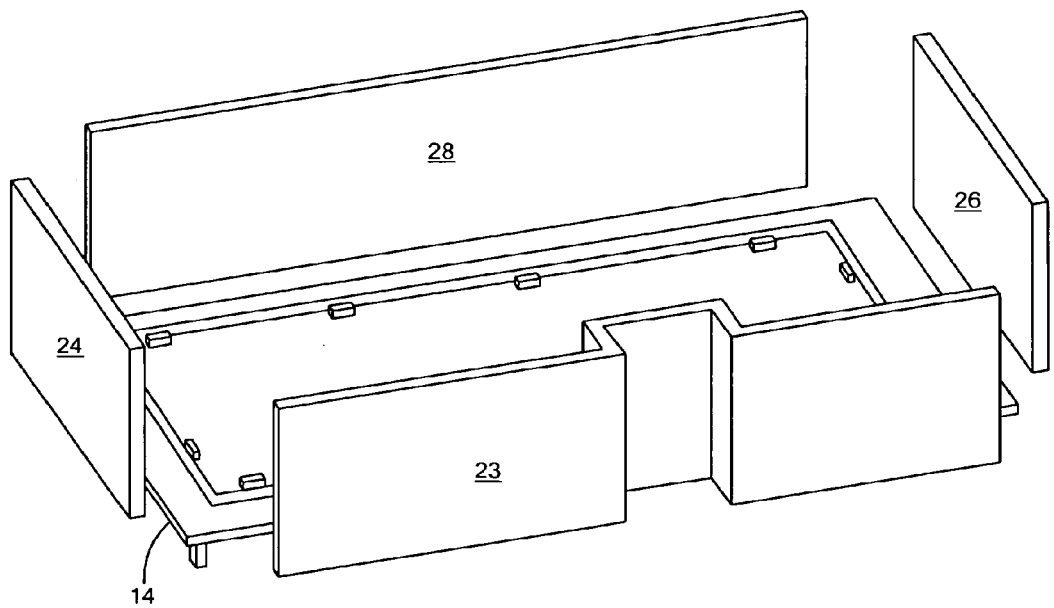
FIG. 15B is a three-dimensional front view of the other deck platform.

Wet concrete is then poured into the wall space 47 between wall forms 23-28 and the core walls of cores 32-36 and the wall space 49 between the adjacent core walls and corner slugs of cores 32-36, similar as discussed above with reference to FIG. 15. The wet 15 concrete is allowed to set until initial set strengths have been achieved, typically in about two to three hours. While the concrete is still curing, outer wall forms 23-28 are then moved to the open position, similar as discussed above with reference to FIG. 16A. The corner slugs are moved to the elevated position, e.g., as discussed above with reference to FIG. 17A. Cores 32-36 are then placed on floor 15, FIG. 1, between deck platform 12 and 20 14. System 10 is now ready to start the production process again to manufacture additional concrete modular housing units.

Figure 9B:
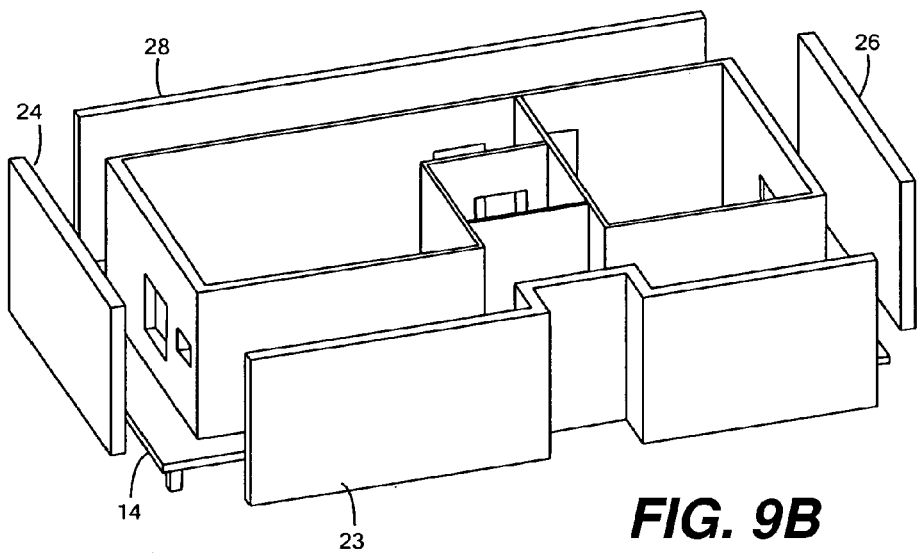
FIG. 9B is a three-dimensional front view of the other deck platform.

Although as discussed above with reference to FIGS. 1-25B, core 32 and/or cores 24-36 are placed on a pre-poured floor slab which has been positioned on either a left deck platform 12 or a right deck platform 14, this is not a necessary limitation of this invention. At times there may be a need to build concrete modular housing units directly on grade on slab (concrete foundation), e.g., the ground floor modular housing units. To accomplish this, system 10, FIG. 1, of another embodiment, places core 32, and/or cores 34 and 36, directly on a deck platform 12 or deck platform 14. In this embodiment, concrete slab 70, or concrete slab 152, FIG. 20, is not utilized. Module cage, e.g., having a similar structure to modular cage 110, FIG. 9, is preferably not tied to the floor inserts protruding from the floor slab, as discussed above with reference to FIG. 12.

Figure 26:
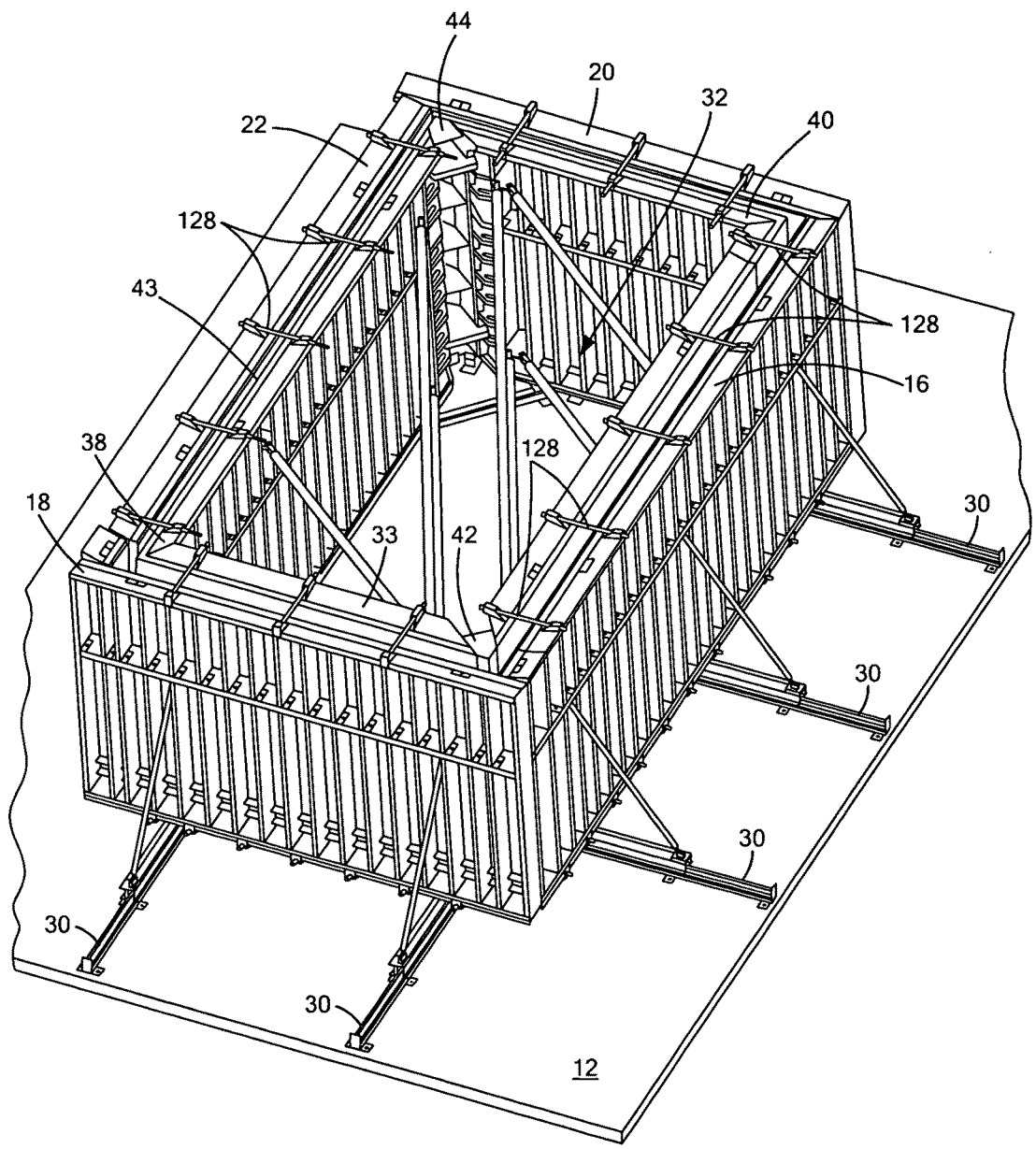
FIG. 26 is a three-dimensional view showing in further detail the structure of one of the cores shown in one or more of FIGS. 1-25B.

For example, movable wall forms 16-22, 20, FIG. 1, or movable walls 23-28, may 10 be moved to the expanded position about the core walls of cores 32-36, as discussed above with reference to FIGS. 10A and 11A, and the wet concrete is poured. For example, exterior wall form 18, FIG. 10A, is moved to the appropriate position proximate core wall 33 of core 32 by rolling on track 30, FIG. 26, via wheel 31 in direction 33 until it butts up against face 176 of deck platform 12. Exterior wall form 18 is then secured in place using 15 bolt assembly 170, e.g., bolt 171 and nut 172. Wall forms 16, 20 and 26, FIG. 10A, are moved in a similar fashion.

Figure 27:
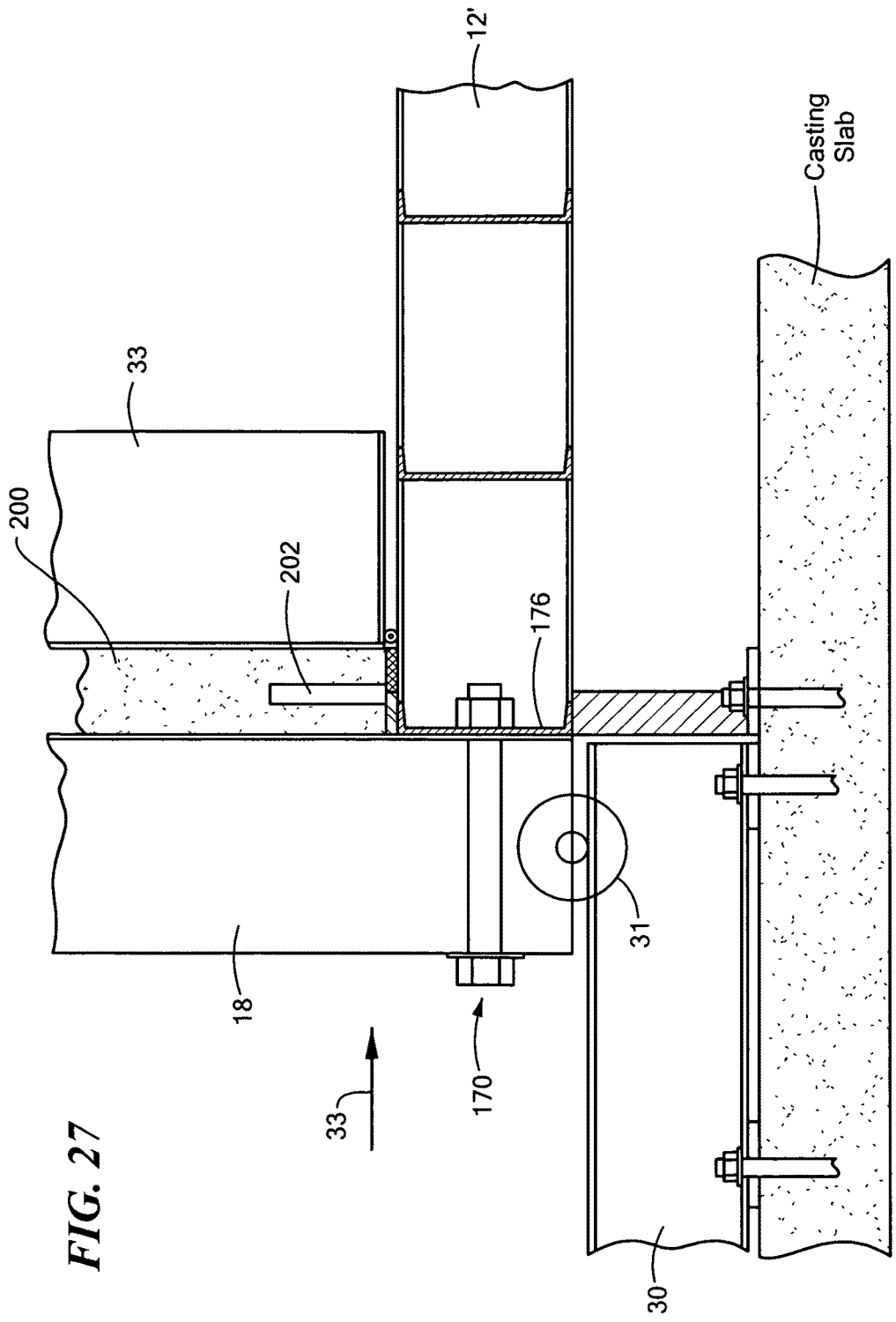
FIG. 27 is a schematic side view showing in further detail one embodiment of the connection between an outer form wall and the deck platform of another embodiment of this invention wherein a floor slab is not utilized.

In this embodiment, the bottom of selected concrete walls in the wall space between the wall forms and core walls and/or between adjacent core wall preferably include one or more voids corresponding to a layout of inserts, such as rebar or similar type inserts, on the slab on grade. For example, poured concrete wall 200, FIG. 27, includes void 202 that may be created by placing a corrugated sleeve of a preferred length, e.g., about 7-11" long, or any desired length, to form a seismic sleeve in wall 200 before the wet concrete is poured. In one example, slab on grade 208, FIG. 28, includes a plurality of inserts 204 which align with voids 202, FIG. 27, at the bottom of selected concrete walls. In one example, the plurality of inserts 204, FIG. 28, may be located at the corners on slab on grade 208, which corresponds to the corners of a concrete modular housing unit 206, FIG. 28, manufactured in accordance with this embodiment. In other examples, the plurality of inserts 204, FIG. 27, may be at other locations on grade on slab 208.

Figure 28:
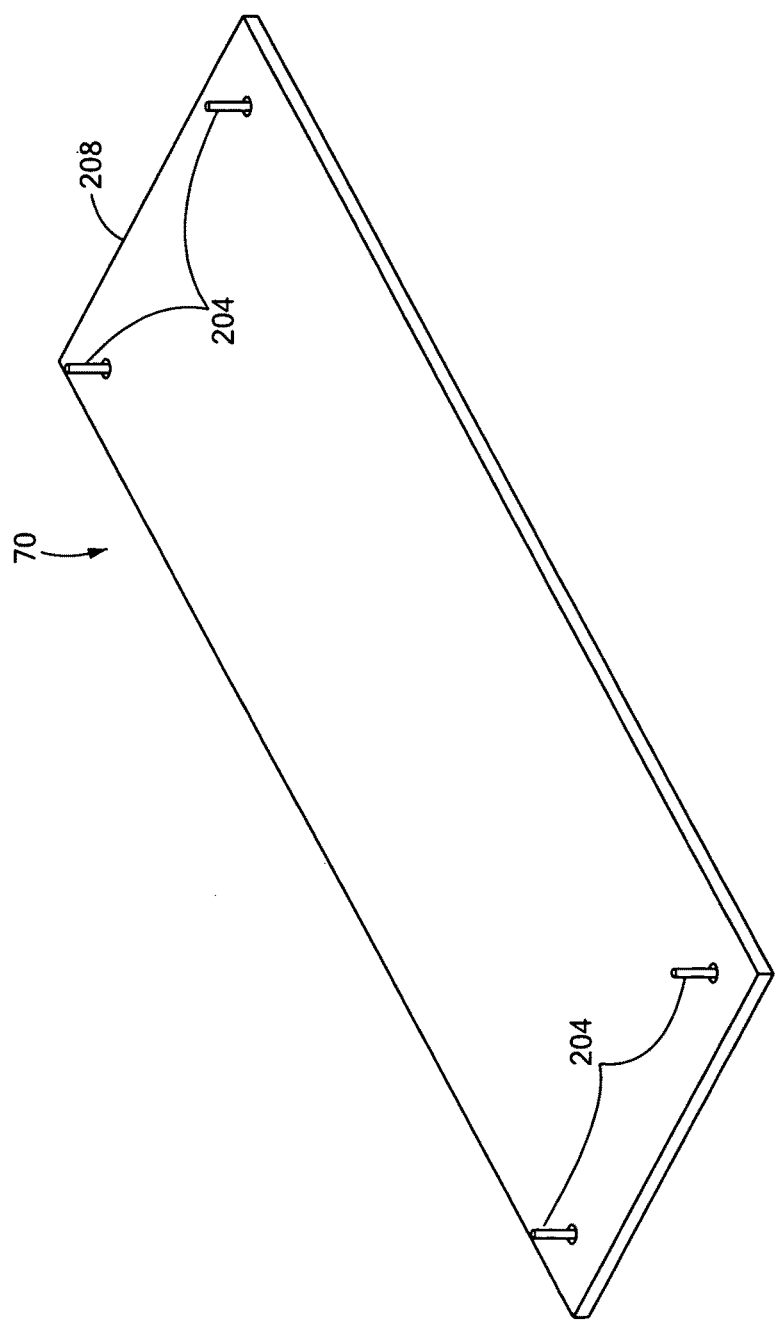
FIG. 28 is a three-dimensional front view showing one embodiment of a plurality of inserts in place on a slab on grade in accordance with this invention.
Figure 29:
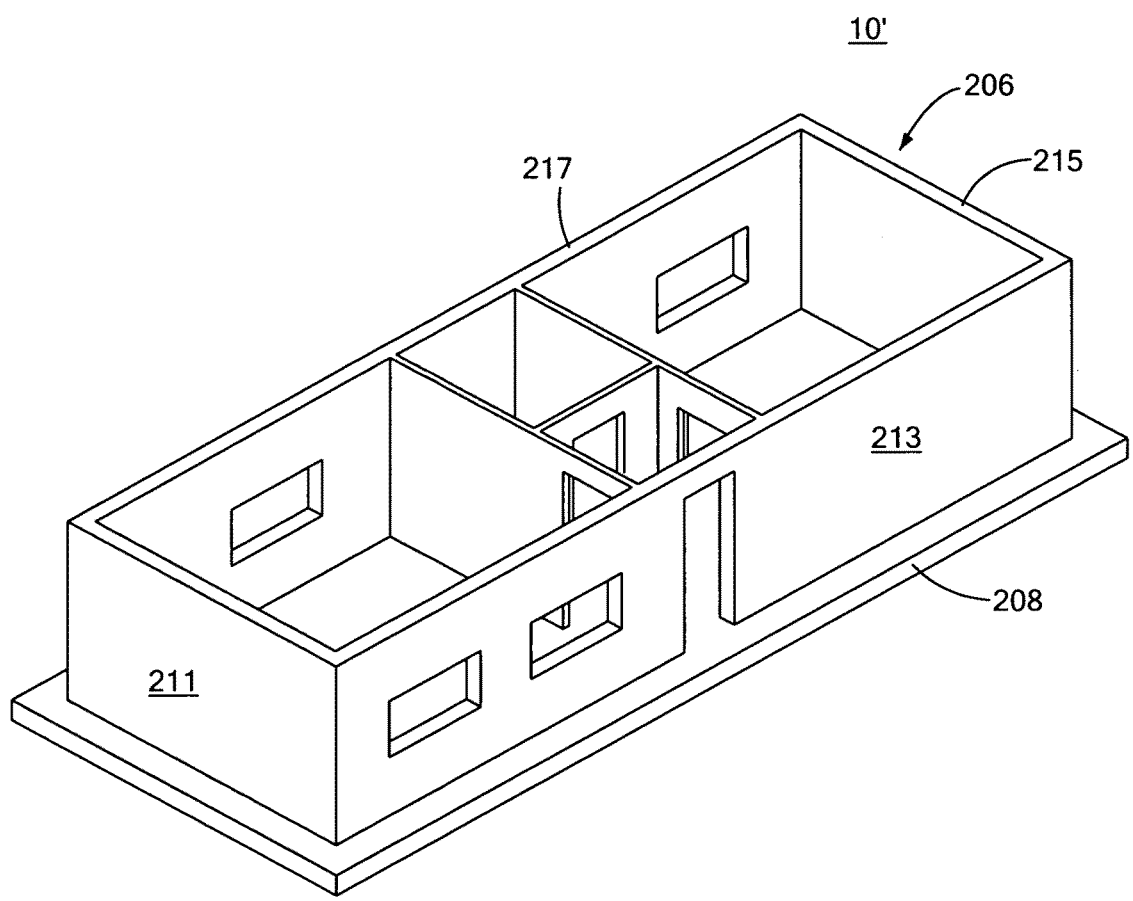
FIG. 29 is a three-dimensional front view showing a concrete modular housing unit manufactured using one embodiment of this invention in place on the grade on slab shown in FIG. 28.

Concrete modular housing unit 206, FIG. 29, having voids at selected locations in the bottom of walls 211, 213, 215, and 217, is then lowered in place on the slab on grade 208, such that the plurality of inserts 204, FIG. 28, on the slab on grade 208, mate with the voids, e.g., void 202, FIG. 29, in the selected walls. The joint is preferably grouted with non shrinking high strength grout or filled with high strength epoxy. This joins the modular housing unit 206 to grade on slab 208.

In order for cores 32-36, movable wall forms 18-22 and 23-28, and the like, to be utilized when no floor slab is utilized, a few options may be used. In one example, cores 32-36 may be manufactured to be taller by the amount of the floor slab height. This is necessary since the cores 32-36 are typically resting on the deck platform and not on the concrete floor slab. Therefore the heights of the core walls of cores 32-36 are adjusted accordingly. In another example, extensions may be built on either the top or bottom of the core walls of cores 32-36 which correspond directly to the height of the floor slab. In one design, the extensions may be added to the core walls after they are in place on deck platform 12. In other designs, the extensions may be utilized for repeated manufacturing of ground floor concrete modular housing units.

The system and method for the accelerated manufacturing of concrete modular housing units discussed above with reference to one or more of FIGS. 1-29 may utilize horizontally poured walls. Horizontally pouring walls is preferably designed to allow for flexibility in producing various desired architectural finishes on the outside walls of the concrete modular units. Pouring the concrete into a horizontally placed form provides more control of the flow of the wet concrete as it is poured and reduces the gravitational effect of pouring concrete above a ten or twelve foot form. The pre-poured walls may be manufactured at the location of the deck platforms or at another location and later transported to the location of the deck platform.

Figure 30:
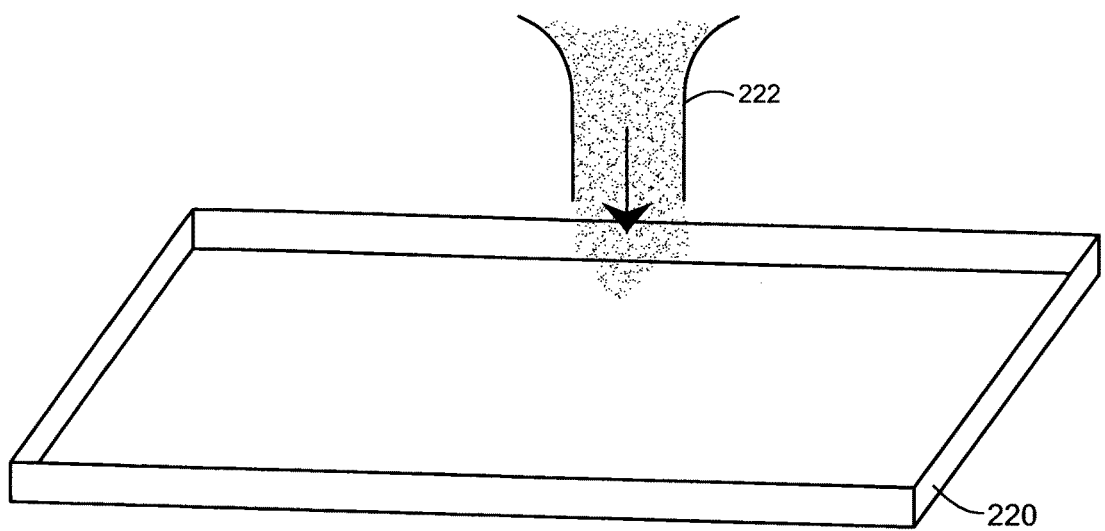
FIG. 30 is a three-dimensional front view showing one embodiment of an exterior wall being horizontally poured in accordance with one embodiment of this invention.
Figure 32:
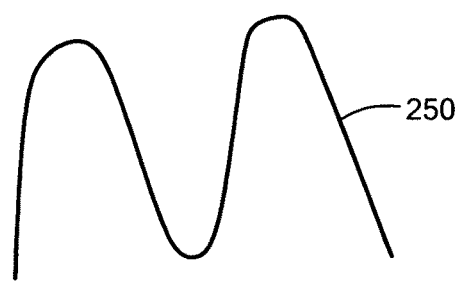
FIG. 32 is a schematic side view of one example of a securing device which may be used to attach the horizontally poured wall shown in FIG. 31 to a vertically poured wall.

In one example, the process of horizontally pouring walls begins by providing horizontally placed form 220, FIG. 30, with appropriate wall thickness, e.g. about 3" minimum to about 10" maximum. Form 220 is preferably oiled and then a liner, e.g., a brick or other similar type of liner may be placed on the form. Next, wire mesh is placed in form 220 and wet concrete 222 poured. Using horizontally placed wall form 220 allows wet concrete 222 to be poured in a close proximity, e.g., about 12" to 18" from wall form 220. This allows wet concrete 222 to be poured in a controlled manner in a controlled flow which negates gravitational forces of pouring concrete above a ten or twelve foot form, e.g., wall forms 16-22 or wall forms 23-28, FIGS. 1 and 18. Additionally, pouring concrete 222, FIG. 30, in a controlled manner and in a close proximity to wall form 220 uniformly distributes the aggregate therein to create horizontally pre-poured wall 226, FIG. 31, having a uniform distribution of aggregate. Then, insulation may be placed and secured by a securing device, e.g., "M" tie 250, FIG. 32, or any various types of securing devices. "M" ties are typically made with steel wires and resemble the shape of letter M. The "M" ties are preferably placed according to the design specification in a manner that they pass through the insulation and are embedded in the concrete. The "M" ties have a designed length such that they preferably stick out about two or three inches from the insulation. In operation, one or more of the cured horizontally poured walls are then positioned proximate one or more core walls.

Figure 31:
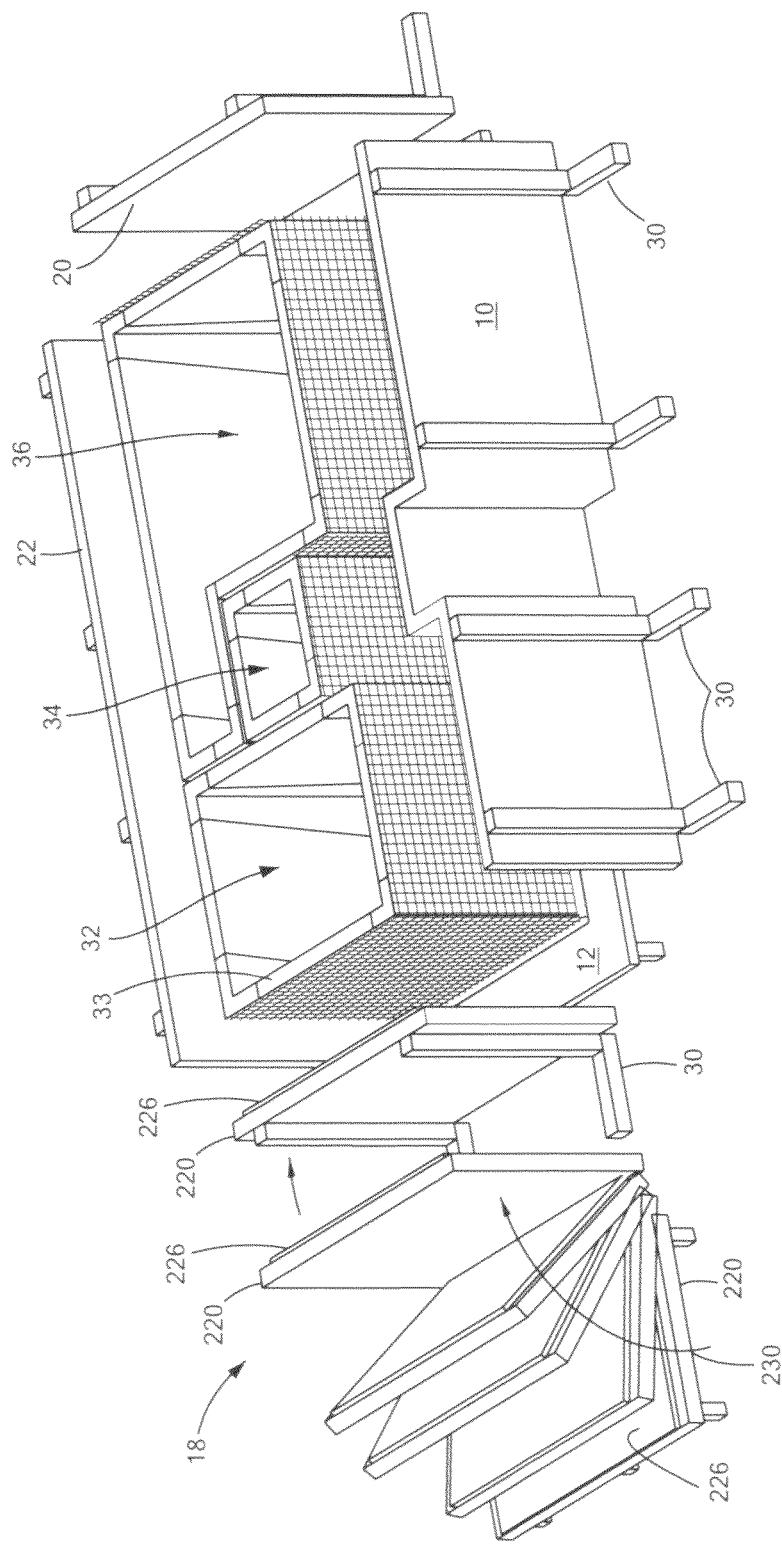
FIG. 31 is a three-dimensional front view showing one embodiment of a horizontally poured being moved into position proximate a core in accordance with this invention.

For example, horizontally pre-poured wall 226, FIG. 31, is tilted, as shown by arrow 230, into position, in this example, proximate core wall 33 of core 32 to define the appropriate wall space there between, e.g., wall space 320, FIG. 33, similar as discussed above with reference to FIGS. 10A and 11A. Once the wall form 220, FIG. 31, is in place proximate core wall 33, "M" ties 250, FIG. 33, are protruding from pre-poured wall 226 10 and insulation 321 as shown. Concrete is poured into wall space 320 between wall 226 and core wall 33. FIG. 34 shows concrete 322 and "M" ties 250 embedded in concrete 322 which form a mechanical bond to concrete 322. In this example, once the concrete is cured, form 220, FIG. 31, is slowly retracted away from wall 226.

In another embodiment, one or more of wall forms 18-22, FIGS. 1 and 20, of left deck platform 12 and/or one or more of wall forms 23-28 of right deck platform 14 may be replaced with horizontally poured walls on the exterior of the concrete modular housing units to attain the desired architectural finish. For example, the previous horizontally pre-poured walls may replace of one or more, or all of, wall forms 18-22, FIGS. 1 and 20, and/or wall forms 23-28. The pre-poured walls are positioned vertically proximate selected core walls of cores 32-36, and the walls are closed and secured together, as discussed above. Wet concrete is then poured into the wall space between the pre-poured walls and the core walls.

In one embodiment, once the horizontally poured wall is cured in form 220, FIG. 30, the wall may be removed (stripped) from the form and stored at a different location for use at a later date. When the wall is ready to be cast in the rest of the module the wall (or walls) is brought in from the storage yard and placed in the proper elevation and secured to the other steel wall forms by mechanical means. In a similar fashion as described above, the "M" ties are preferably protruding from the pre-poured wall. As the remaining concrete is poured these ties are embedded in the concrete thus forming a mechanical bond between the horizontal wall and the remainder of the module. Once the module is cured, the other steel panels are slowly retracted away from the module. The same process can be utilized to pour any side wall to attain the desired architectural finish.

Figure 35:
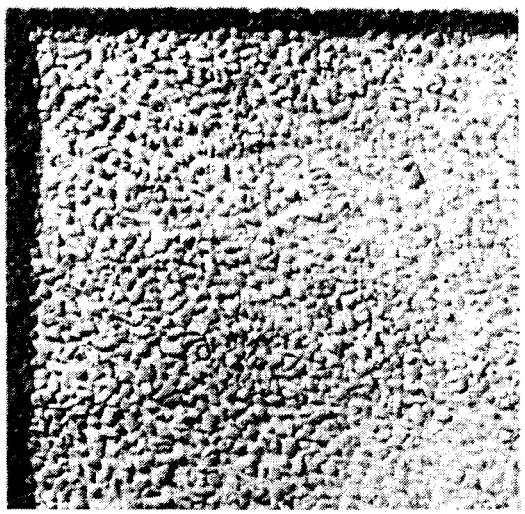
FIG. 35 is a photograph showing one example of an architectural finish that may be achieved using horizontally poured walls in accordance with one embodiment of this invention.
Figure 36:
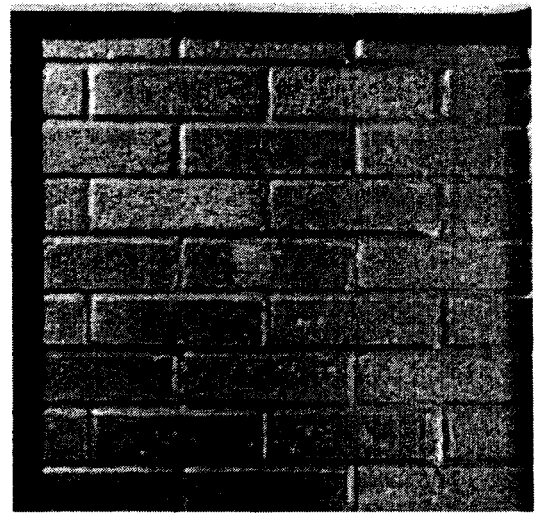
FIG. 36 is a photograph showing another example of another architectural finish that may be achieved using horizontally poured walls in accordance with one embodiment of this invention.
Figure 37:
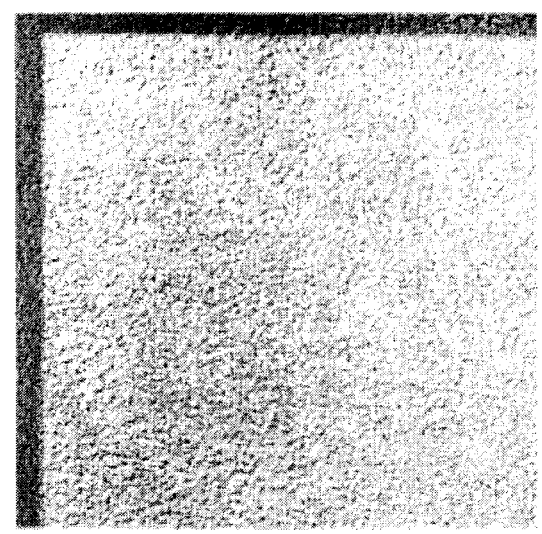
FIG. 37 is a photograph showing yet another example of yet another architectural finish that may be achieved using horizontally poured walls in accordance with one embodiment of this invention.

The benefits of horizontally pouring walls may include architectural finish including brick facade, exposed aggregate having a uniform distribution, color concrete, acid etching, and decorative wall finishes, and the like. FIGS. 35, 36, and 37 show a few examples of the various decorative wall finishes such as brush, hammer, brick, and sandblast, respectively that may be achieved using horizontally poured walls in accordance with one or more embodiments of system 10. Other various decorative wall finishes are known to those skilled in the art. Horizontally pouring walls also preferably provides a high level of control on quality of pre-poured wall, cost savings by pouring color or special concrete only where needed, ease of placing openings such as windows, doors, and the like, and the ability to apply controlled vibration only where needed.

Figure 38:
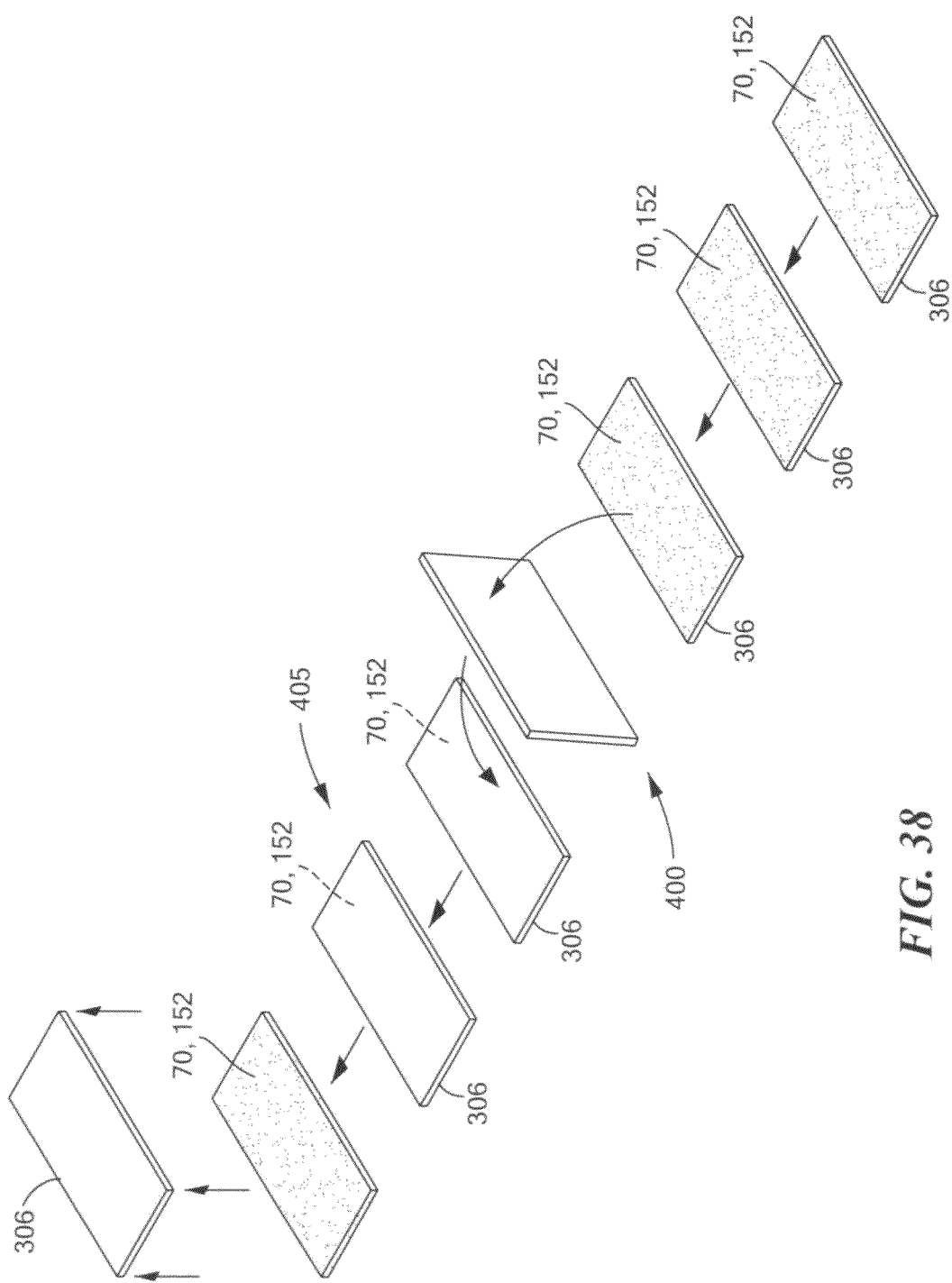
FIG. 38 is a three-dimensional view showing one embodiment of a horizontally pre-poured floor slab rotated 180 degrees in accordance with one embodiment of this invention.

As discussed above, system 10 may utilize previously poured floor slab 70, FIG. 1, or floor slab 152, FIG. 20. To manufacture slab 70, 152, steel wall form 306, FIG. 38, of appropriate floor thickness may be utilized. Form 306 may be oiled and then a liner, e.g., a brick or other type of liner may be placed on the form. This step may be omitted if no particular type of cosmetic finish is required. Female inserts may be placed upside down at the required locations and secured to the form. Next, a wire mesh and/or the rebar may be placed on spacers and secured appropriately. Once all the steel is secured, concrete is poured and finished by using trowels and or bull float and/or other wet concrete finishing tools and finishing as desired. After the concrete cures in form 306, from 306 with slab 70, 152 is rotated 180 degrees by floor slab turner 400. At this point, the concrete side of the steel form is faced down a shown at 405 and the steel side is on the top. By utilizing jacks that may be hydraulically actuated in strategic locations, or similar type means, form 306 is lifted up until it releases the slab 70, 152. Therein, once form 306 is separated from the concrete of slab 70, 152, form 306 is gradually lifted until it is in an upright position and then lifted off and placed back on the other floor deck for the next casting. Floor slab 70, 152 is removed and stored for use at a later date.

The benefits of horizontally casting floors allow the floors to be poured separately and then the slab attached to the module at a different production stage, poured in a pan upside down to provide smooth finish once flipped, removed from the critical path, placed on the form and concrete poured to make it a monolithic piece, and architectural finishes.

In one embodiment of this invention, internal cores could be removed from the top so the concrete is undisturbed and the form is available for a second pour. Internal cores could also be removed from the sides. For example, if there is a modular piece that has 4 sides and is open at the front, a track could be placed so the core can be moved into position via hydraulic, electric, pneumatic means. Once concrete is placed, the cores can be collapsed and retracted from the form. Such a design provides unlimited design flexibility to create custom living space. These cores are collapsible via mechanical, hydraulic, or pneumatic means.

The benefits of internal cores may include flexibility of use, various configurations, ease of use during production, reduced cycle times, and the like.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A system for accelerated manufacturing of concrete modular housing units comprising:
    a first deck platform including a plurality of exterior movable wall forms;
    a second deck platform including a plurality of exterior movable wall forms;
    a first concrete slab placed on the first deck platform;
    at least one core including a plurality of core walls placed on the first concrete slab, one of a top surface and a bottom surface of one of the plurality of core walls including an alignment pin thereon;
    wherein the exterior movable wall forms of the first deck platform are positioned proximate the core walls to define a wall space there between, the wall space configured to receive wet concrete and create a first concrete modular housing unit;
    a second concrete slab placed on the second deck platform; and
    wherein the wet concrete in the wall space is allowed to set a until it is partially cured and then the at least one core is removed from the first concrete slab and placed on the second concrete slab such that the at least one core can be reused one or more times during a predetermined amount of time to create a least a second concrete modular housing unit while the first concrete modular housing unit is still curing.

2. The system of claim 1 in which the predetermined amount of time is about twenty four hours.

3. The system of claim 1 in which the at least one core is removed from the first concrete slab after about at least 2 hours.

4. The system of claim 1 in which the at least one core is turned upside down prior to be placed on the second deck platform.

5. The system of claim 1 in which the at least one core include at least one movable corner slug.

6. The system of claim 5 in which the at least one movable corner slug is V-shaped.

7. The system of claim 5 in which the at least one movable corner slug is configured to be positioned in an expanded position and in an elevated position.

8. The system of claim 7 in which the elevated position is configured to allow the core walls to provide a necessary space between the wall forms and the partially cured concrete in the wall space to allow the core to be removed from the first deck platform or the second deck platform while the concrete is still curing.

9. The system of claim 1 in which the at least one core includes a plurality of cores.

10. The system of claim 1 in which the first concrete slab and/or the second concrete slab each include a plurality of precast slots.

11. The system of claim 10 in which the alignment pin mates with the precast slots such that the core is positioned at a predetermined location on the first concrete slab or the second concrete slab.

12. The system of claim 1 in which the first concrete slab and/or the second concrete slab is previously poured.

13. The system of claim 12 in which the first concrete slab and/or the second concrete slab is poured into a floor form and then turned upside down prior to being placed on the first deck platform or the second deck platform or the second deck platform such that the top surface thereof has a smooth finish.

14. The system of claim 1 in which the first concrete slab and/or the second concrete slab includes a plurality of female inserts each configured to secure a rod.

15. The system of claim 1 in which the first concrete slab and/or the second concrete slab includes a plurality of previously casted bent rods therein protruding upwardly from the first concrete slab and/or the second concrete slab.

16. The system of claim 14 further including a reinforcing cage configured to be placed about the at least one core and attached to the rod in each of the female inserts.

17. The system of claim 15 further including a reinforcing cage configured to be placed about the at least one core and attached to the bent rods.

18. The system of claim 1 in which the first concrete slab and/or the second concrete slab includes one or more embeds configured to stabilize and level the first concrete and/or the second concrete slab at a predetermined elevation.

19. The system of claim 1 in which the first deck platform includes one or more gaskets configured to position the first concrete slab on the first deck platform.

20. The system of claim 1 in which the second deck platform includes one or more gaskets configured to position the second concrete slab on the first deck platform.

* * * * *